(12) United States Patent
Ishiyama et al.

(10) Patent No.: US 7,649,550 B2
(45) Date of Patent: Jan. 19, 2010

(54) CAMERA SYSTEM, MAIN FRAME ADAPTER AND HEAD ADAPTER

(75) Inventors: Eiji Ishiyama, Asaka (JP); Hiroshi Tanaka, Asaka (JP); Takehiko Senba, Asaka (JP); Keiichiro Takahashi, Asaka (JP); Kentaro Tokiwa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 433 days.

(21) Appl. No.: 11/443,002

(22) Filed: May 31, 2006

(65) Prior Publication Data

US 2006/0268158 A1  Nov. 30, 2006

(30) Foreign Application Priority Data

May 31, 2005  (JP) ............................. 2005-158907

(51) Int. Cl.
*H04N 5/232* (2006.01)

(52) U.S. Cl. ................. 348/211.14; 348/75; 348/333.07

(58) Field of Classification Search ............. 348/14.04, 348/14.05, 75, 158, 211.99, 211.1, 211.2, 348/211.4, 211.14, 211.8, 207.1, 333.01, 348/333.07
See application file for complete search history.

(56) References Cited

U.S. PATENT DOCUMENTS

| | | | | |
|---|---|---|---|---|
| 5,079,634 A * | 1/1992 | Hosono | ................. | 348/211.5 |
| 5,475,441 A * | 12/1995 | Parulski et al. | ............... | 348/552 |
| 5,745,223 A * | 4/1998 | Ikeda | ........................ | 356/4.01 |
| 6,101,339 A * | 8/2000 | Miki et al. | .................. | 396/301 |
| 6,400,903 B1 * | 6/2002 | Conoval | ...................... | 396/56 |
| 6,466,249 B1 * | 10/2002 | Granot et al. | ............ | 348/14.08 |
| 6,707,490 B1 * | 3/2004 | Kido et al. | ............. | 348/211.14 |
| 6,738,075 B1 * | 5/2004 | Torres et al. | ................. | 715/723 |
| 6,941,114 B1 * | 9/2005 | Kuo et al. | ...................... | 455/74 |
| 6,950,859 B1 * | 9/2005 | Bartek et al. | ................. | 709/217 |
| 7,030,910 B2 * | 4/2006 | Ishizaka et al. | ........... | 348/211.2 |
| 7,042,495 B2 * | 5/2006 | Nakamura | ................ | 348/207.1 |
| 7,042,499 B1 * | 5/2006 | Kido et al. | ............. | 348/211.14 |
| 7,140,789 B1 * | 11/2006 | Reinert | ........................ | 396/428 |
| 7,289,139 B2 * | 10/2007 | Amling et al. | ................. | 348/65 |
| 7,330,636 B2 * | 2/2008 | Chikazawa | ................... | 386/46 |
| 7,453,490 B2 * | 11/2008 | Gunday | ........................ | 348/68 |
| 7,508,442 B2 * | 3/2009 | Watanabe et al. | ........... | 348/360 |
| 2001/0043271 A1 * | 11/2001 | Kawano | ...................... | 348/211 |
| 2001/0052930 A1 * | 12/2001 | Adair et al. | .................... | 348/65 |
| 2003/0043771 A1 * | 3/2003 | Mizutani et al. | ............. | 370/338 |
| 2003/0228553 A1 * | 12/2003 | Mandelkern et al. | .......... | 433/29 |

FOREIGN PATENT DOCUMENTS

| | | |
|---|---|---|
| JP | 2004-88396 A | 3/2004 |
| JP | 2004-173036 A | 6/2004 |
| JP | 2004-187127 A | 7/2004 |
| JP | 2004-201073 A | 7/2004 |

\* cited by examiner

*Primary Examiner*—Tuan Ho
*Assistant Examiner*—Chriss S Yoder, III
(74) *Attorney, Agent, or Firm*—Sughrue Mion, PLLC

(57) ABSTRACT

A main frame adapter is detachably mounted, instead of a camera head, on a camera main frame from which the camera head is separated. The camera head comprises an image taking optical system and an imaging device. The camera main frame is adapted to receive an image signal from the camera head that is detachably mounted on the camera main frame. A head adapter that is detachably mounted, instead of the camera main frame, on the camera head separated from the camera main frame. Both the adapters have each the radio communication section.

18 Claims, 25 Drawing Sheets

HEAD ID : "XXXXXXXXXXXX","ZZZZZZZZZZZZ"
CFA PATTERN : HONEY-COM
CCD PIXEL NUMBERS(STILL PICTURE) : VERTICAL PIXEL No.X HORIZONTAL PIXEL No.$(W_1,H_1)$
CCD PIXEL NUMBERS(THROUGH PICTURE) : VERTICAL PIXEL No.X HORIZONTAL PIXEL No.$(W_2,H_2)$
CCD PIXEL NUMBERS(DYNAMIC PICTURE) : VERTICAL PIXEL No.X HORIZONTAL PIXEL No.$(W_3,H_3)$
EFFECTIVE TAKING IN POSITION : START COORDINATES $(X_4,Y_4)$,
　　　　　　　　　　　　　　　VERTICAL PIXEL No.×HORIZONTAL PIXEL No.$(W_4,H_4)$
OB POSITION : START COORDINATES $(X_{OB})$,LENGTH$(W_{OB})$
COMPONENT ORDER : RGBG
A/D Bit DEPTH : 8～14bit/PIXEL
IMAGE CHANNEL TRANSMISSION FORMAT :JPEG
IMAGE RATE(THROUGH IMAGE) : 5fps
IMAGE RATE(DYNAMIC IMAGE) : 5fps,30fps
SPECIAL FUNCTION : PAN HEAD CONTROL (VERTICAL DIRECTION,
　　　　　　　　　　HORIZONTAL DIRECTION)

(a)

HEAD ID : "XXXXXXXXXXXX","ZZZZZZZZZZZZ","YYYYYYYYYYYY"
CFA PATTERN : HONEY-COM
CCD PIXEL NUMBERS(STILL PICTURE) : VERTICAL PIXEL No.X HORIZONTAL PIXEL No.$(W_1,H_1)$
CCD PIXEL NUMBERS(THROUGH PICTURE) : VERTICAL PIXEL No.X HORIZONTAL PIXEL No.$(W_2,H_2)$
CCD PIXEL NUMBERS(DYNAMIC PICTURE) : VERTICAL PIXEL No.X HORIZONTAL PIXEL No.$(W_3,H_3)$
EFFECTIVE TAKING IN POSITION : START COORDINATES $(X_4,Y_4)$,
　　　　　　　　　　　　　　　VERTICAL PIXEL No.×HORIZONTAL PIXEL No.$(W_4,H_4)$
OB POSITION : START COORDINATES $(X_{OB})$,LENGTH$(W_{OB})$
COMPONENT ORDER : RGBG
A/D Bit DEPTH : 8～14bit/PIXEL
IMAGE CHANNEL TRANSMISSION FORMAT :JPEG
IMAGE RATE(THROUGH IMAGE) : 5fps
IMAGE RATE(DYNAMIC IMAGE) : 5fps
SPECIAL FUNCTION : PAN HEAD CONTROL (VERTICAL DIRECTION,
　　　　　　　　　　HORIZONTAL DIRECTION),
　　　　　　　　　　WAIT FOR COMMUNICATION LINK ESTABLISHMENT
TIME OUT VALUE : 10sec (b)

Fig. 19

CAMERA SYSTEM, MAIN FRAME ADAPTER AND HEAD ADAPTER

BACKGROUND OF THE INVENTION

1. Field of the Invention

The present invention relates to a camera system comprising a camera head having an image taking optical system and an image sensor, and a camera main frame for receiving an image signal from the camera head that is mounted on an exchangeable basis to perform an image processing, and a main frame adapter, and a head adapter.

2. Description of the Related Art

There is proposed a camera system wherein when a camera head, which has an image taking optical system and an image sensor, is detachably mounted on a camera main frame for performing a signal processing, it is possible to performs photography making the best use of photographic functions of the camera head. According to such a camera system, it is considered that the selection of the camera head makes it possible to freely performs photography changing focal length and focal range in a similar fashion to that of the conventional interchangeable lens, and further it is considered that color photography can be freely performed with color shades of an image sensor having various color filters.

In the camera system as mentioned above, it is convenient not only that photography can be performed when the camera head is in a state that it is mounted on the camera main frame, but also that photography can be performed through a remote control even when the camera head is in a state that the camera head is separated from the camera main frame.

Hence, there are proposed schemes in which the camera head and the camera main frame are each provided with a radio communication apparatus, so that communications of image signals and control signals can be performed on a wireless basis (cf. for example, Japanese Patent Application Laid Open Gazettes TokuKai 2004-201073, TokuKai 2004-173036, TokuKai 2004-187127, and TokuKai 2004-88396).

According to Japanese Patent Application Laid Open Gazettes TokuKai 2004-201073, in view of operability at the user side, when the camera head is mounted on the camera main frame, photography can be performed, and when the camera head is in a state that the camera head is separated from the camera main frame, photography according to a remote control can be performed in such a manner that a sensor and the like detect the state of the separation and automatically turn on a radio communication apparatus.

In the event that photography is performed in accordance with such a remote control, there is a possibility that it happens that the camera main frame cannot perform signal processing unless a frame rate is down in accordance with a transmission capacity of the radio communication apparatuses of both the camera head and the camera main frame. Thus, there is proposed a scheme that image signals are surely transmitted from the camera head to the camera main frame in such a manner that processing time for a frame of image signal is expanded, and/or the number of pixel numbers is reduced so that a frame rate is down (cf. for example, Japanese Patent Application Laid Open Gazettes TokuKai 2004-173036, and TokuKai 2004-187127).

However, the radio communication apparatuses, which are needed when the camera head and the camera main frame are separated from one another, are not needed when the camera head is mounted on the camera main frame. The radio communication apparatuses are not completely needed for a person who does not intend to perform photography in the state of the separation of the camera head and the camera main frame. Intention to provide the radio communication apparatuses inside the camera head and the camera main frame would bring about an enlargement of the camera head and the camera main frame.

In order to avoid the problems as mentioned above, according to Japanese Patent Application Laid Open Gazette TokuKai 2004-88396, there is proposed a system that a camera head and a camera main frame, which are each provided with a radio communication apparatus, are prepared as dedicated devices, and a person, who wishes to perform photography according to a remote control, buys such dedicated devices.

However, the above-mentioned system involves such a problem that a person, who wishes to perform photography through attachment of a camera head to a camera main frame, and also wishes to perform photography through separation of the camera head to the camera main frame, is obliged to buy the dedicated devices in addition to the original camera system.

SUMMARY OF THE INVENTION

In view of the foregoing, it is an object of the present invention to provide a camera system that is low cost, compact, and capable of performing photography according to a remote control, a head adapter capable of being readily mounted on a camera main frame when performing photography according to a remote control, and a main frame adapter.

To achieve the above-mentioned objects, the present invention provides a camera system comprising:

a camera head comprising an image taking optical system and an imaging device;

a camera main frame that receives an image signal from the camera head that is detachably mounted on the camera main frame;

a head adapter that is detachably mounted, instead of the camera main frame, on the camera head separated from the camera main frame; and a main frame adapter that is detachably mounted, instead of the camera head, on the camera main frame from which the camera head is separated, wherein the head adapter comprises:

a head side radio communication section that performs a radio communication between the head adapter and the main frame adapter; and a head side signal mediating section that converts a format of a signal to be transferred between the camera head and the head side radio communicating section to mediate the signal to be transferred between the camera head and the head side radio communicating section, and wherein the main frame adapter comprises:

a main frame side radio communication section that performs a radio communication between the head adapter and the main frame adapter; and a main frame side signal mediating section that converts a format of a signal to be transferred between the camera main frame and the main frame side signal mediating section to mediate the signal to be transferred between the camera main frame and the main frame side signal mediating section.

According to the camera system of the present invention, in photography by the remote control, an attachment of the head adapter and the main frame adapter onto the camera head and the camera main frame makes it possible to perform a radio communication between the main frame side radio communication section and the head side radio communication section, so that the radio communication of control signals and image signals, which is necessary for photography, can be performed. At that time, the head side signal mediating section converts a format of a signal to be transferred between the camera head and the head side radio communicating section to mediate the signal to be transferred between the camera head and the head side radio communicating section. And the main frame side signal mediating section converts a format of a signal to be transferred between the camera main frame and the main frame side signal mediating section to mediate the signal to be transferred between the camera main frame and the main frame side signal mediating section. This feature makes it possible to smoothly perform the radio communication.

Thus, the use of the head side signal mediating section and the main frame side signal mediating section makes it possible to implement smooth radio communication of the image signals and the control signals. This feature makes it possible to implement a camera system capable of performing fine photography even if the camera head is separated from the camera main frame.

According to the camera system as mentioned above, in view of the assumption that various types of camera heads and camera main frames will come onto the market, it is required for the head adapter and the main frame adapter to perform signal processing according to various types of camera heads and camera main frames.

According to the camera system of the present invention as mentioned above, the head adapter and the main frame adapter incorporate the head side signal mediating section and the main frame side signal mediating section. Thus, any one is able to implement a camera system capable of performing photography according to the remote control, as far as it is concerned with the camera head and the camera main frame having a signal format that is supported by the head adapter and the main frame adapter as mentioned above.

That is, according to the present invention, it is possible to implement a camera system capable of performing photography according to the remote control, which is compact and is reduced in cost.

In the camera system according to the present invention as mentioned above, it is preferable that the main frame adapter operates upon receipt of supply of an electric power from the camera main frame.

This feature makes it possible to contribute to a miniaturization of the main frame adapter, since there is no need that the main frame adapter is provided with a battery.

In the camera system according to the present invention as mentioned above, it is preferable that the head adapter incorporates therein a battery and operates with an electric power from the battery, and supplies the electric power to the camera main frame.

This feature makes it possible that the camera head is operable by supply of the electric power from the camera main frame or supply of the electric power from the head adapter.

In the camera system according to the present invention as mentioned above, it is preferable that the head adapter has a pedestal that supports the camera head onto which the head adapter is mounted.

This feature makes it possible to perform photography in such a way that a photographic picture angle is set up beforehand by self-support of the head adapter mounted on the camera head on the pedestal, and a control signal is transmitted from the camera main frame onto which the main frame adapter is mounted.

In the camera system according to the present invention as mentioned above, it is preferable that the pedestal has an adjustment mechanism that controls a direction of the camera head.

In the camera system according to the present invention as mentioned above, it is preferable that the camera main frame has a handler that controls a direction of the camera head, and the head adapter has a head driving section that receives a control signal according to an operation of the handler via the main frame adapter to drive the adjustment mechanism in accordance with the control signal.

This feature makes it possible for an operator to enjoy photography in such a way that the head driving section adjusts the direction of the camera head in accordance with an operation of the handler of the camera main frame so that the picture angle of the subject, which is caught by the image taking optical system of the camera head, is varied.

In the camera system according to the present invention as mentioned above, it is preferable that the handler is allotted with a function that is different from an adjustment for a direction of the camera head in a state that the camera head is directly mounted on the camera main frame.

This feature makes it possible that a handler, which serves as, for example, an electronic zoom function, in a state that the camera head is mounted on the camera main frame, serves as a handler for a rotary instruction to rotate the adjustment mechanism in a state that the camera head is separated from the camera main frame.

The reduction of the number of parts makes it possible to contribute to reduction of the cost.

In the camera system according to the present invention as mentioned above, it is preferable that the main frame adapter has a handler that controls a direction of the camera head, and the head adapter has a head driving section that receives a control signal according to an operation of the handler from the main frame adapter to drive the adjustment mechanism in accordance with the control signal.

In the camera system according to the present invention as mentioned above, it is preferable that the camera main frame has initialization executing means that executes initialization for the camera system upon receipt of initialization information necessary for initialization for the camera system as to the main frame adapter, the head adapter, and the camera head onto which the head adapter is mounted, from the main frame adapter mounted on the camera main frame.

This feature makes it possible that the camera main frame executes initializing processing upon receipt of information necessary for initialization of the camera system having the camera main frame and the main frame adapter that is mounted on the camera main frame, and the camera head and the head adapter that is mounted on the camera head.

As mentioned above, it is assumed that that various types of camera heads and adapters will come onto the market.

According to the camera system of the present invention, even if any type of the adapters is mounted on the camera head and the camera main frame, it is possible to perform the optimum initialization processing for the camera system.

To achieve the above-mentioned objects, the present invention provides a main frame adapter that is detachably mounted, instead of a camera head, on a camera main frame from which the camera head is separated, the camera head comprising an image taking optical system and an imaging device, and the camera main frame adapted to receive an image signal from the camera head that is detachably mounted on the camera main frame, wherein the main frame adapter comprises:

a main frame side radio communication section that performs a radio communication between the head adapter and the main frame adapter; and a main frame side signal mediating section that converts a format of a signal to be transferred between the camera main frame and the main frame side signal mediating section to mediate the signal to be transferred between the camera main frame and the main frame side signal mediating section.

To achieve the above-mentioned objects, the present invention provides a head adapter that is detachably mounted, instead of a camera main frame, on a camera head separated from the camera main frame, the camera head comprising an image taking optical system and an imaging device, and the camera main frame adapted to receive an image signal from the camera head that is detachably mounted on the camera main frame, wherein the head adapter comprises:

a head side radio communication section that performs a radio communication between the head adapter and the main frame adapter; and a head side signal mediating section that converts a format of a signal to be transferred between the camera head and the head side radio communicating section to mediate the signal to be transferred between the camera head and the head side radio communicating section.

In the event that the main frame adapter and the head adapter of the present invention are attachments for the camera system of the present invention, it is possible that in the usual photography the main frame adapter and the head adapter are carried as a reserve, and in the photography the main frame adapter is mounted on the camera main frame and the head adapter is mounted on the camera head.

BRIEF DESCRIPTION OF THE DRAWINGS

FIG. 6 is an internal structural view of the head adapter 2a mounted on the camera head 1a.

FIG. 10 is a flowchart useful for understanding a procedure to be carried out by the main frame adapter CPU 20b, after the main frame adapter 2b is activated to establish a link between a main frame side radio communication section 21b and a head side radio communication section 25a.

FIG. 12 is a flowchart useful for understanding a procedure of an initializing processing that is to be carried out by a head adapter CPU 20a of the head adapter 2a.

FIG. 14 is a flowchart useful for understanding a power source turn-off processing to be carried out by the head adapter CPU 19a.

FIG. 15 is a flowchart useful for understanding a communication of initialization processing information among the camera main frame 1b, the main frame adapter 2b, the head adapter 2a, and the camera head 1a.

FIG. 19 is a flowchart useful for understanding combined information in which pieces of initialization information are combined.

FIG. 21 is a view showing an example of a pedestal 3 for supporting the head adapter 2a.

DETAILED DESCRIPTION OF PREFERRED EMBODIMENTS

Embodiments of the present invention will be described with reference to the accompanying drawings.

Figure 1:
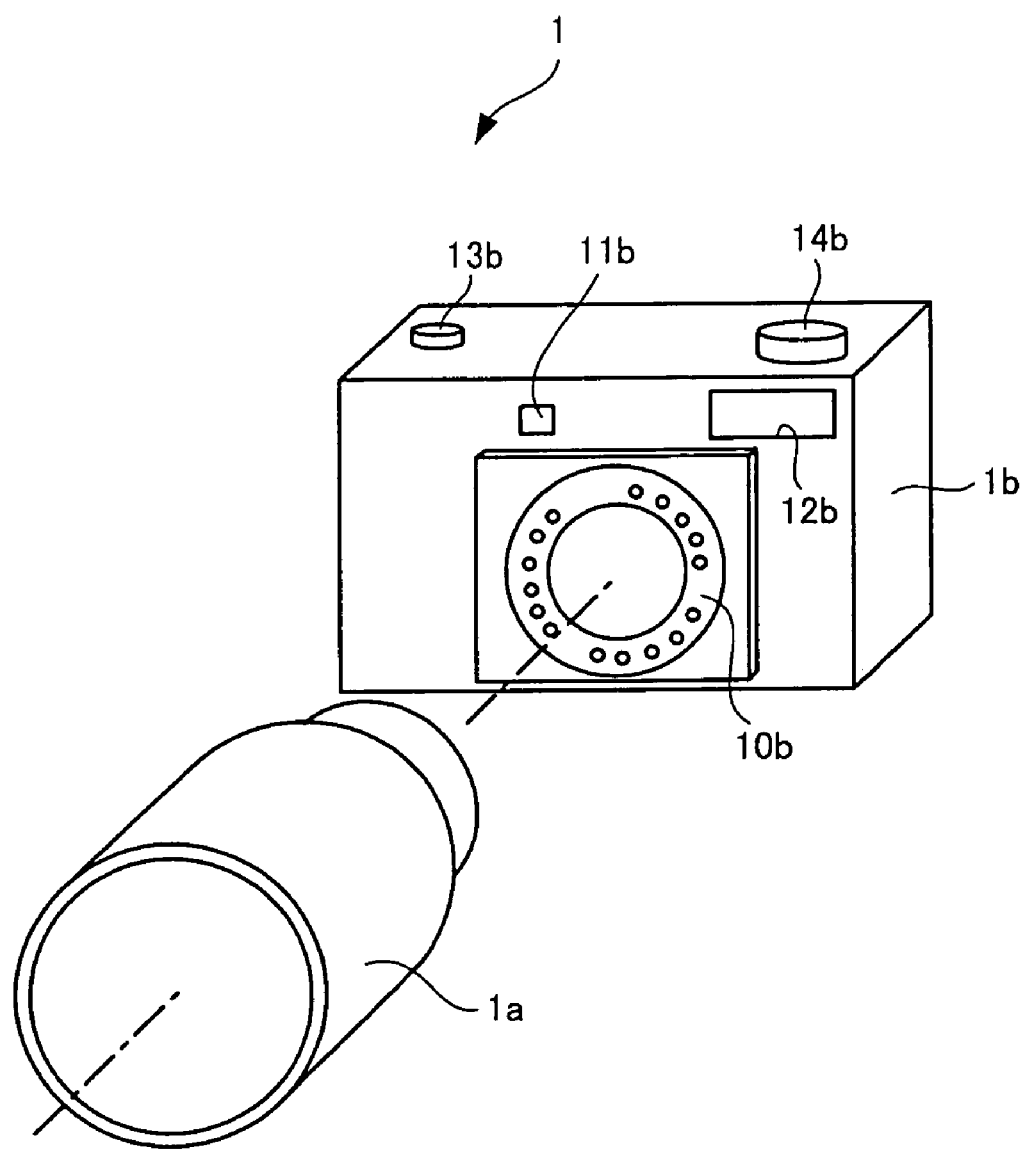
FIG. 1 is a view of a camera system according to an embodiment of the present invention.

FIG. 1 is a view of a camera system according to an embodiment of the present invention.

A camera system 1 shown in FIG. 1 is provided with head adapter and main frame adapter, as attachments, which are detachably mounted when photography according to a remote control is performed. Attachment of those adapters makes it possible to perform photography according to a remote control. First, there will be explained structure and operation of the camera system in a state that a camera head 1a is mounted on a camera main frame, and thereafter, there will be explained structure and operation of the camera system in which the head adapter and the main frame adapter are separated and photography is performed using a camera head in accordance with a remote control of the camera main frame.

As shown in FIG. 1, the camera system 1 according to the present embodiment comprises a camera head 1a having an image taking optical system and an image sensor, and a camera main frame 1b that receives an image signal from the camera head 1a via an interface for transferring signals between the camera main frame 1b and the camera head 1a. FIG. 1 shows individually a plurality of camera heads 1a each having an image taking optical system and an image sensor and the camera main frame 1b on which anyone of the camera heads 1a is detachably mounted.

At the center of the camera main frame 1b shown in FIG. 1, there is arranged a mount section 10b having a large number of mount contacts to receive a terminal of the camera head 1a. The terminal of the camera head 1a has also a large number of mount contacts so that the terminal of the camera head 1a is engaged with the mount section 10b along the dashed line shown in FIG. 1 in such a manner that the mount contacts of both the camera head 1a and the camera main frame 1b meet in their associated positions.

The large number of mount contacts are allotted for the use of communications and power supply, so that communications from the camera main frame 1b to the camera head 1a is carried out, communications from the camera head 1a to the camera main frame 1b is carried out, and power supply from the camera main frame 1b to the camera head 1a is carried out. Those mount contacts include contacts associated with the interfaces involved in both the camera head 1a and the camera main frame 1b, contacts associated with two dedicated lines for supplying a release signal from the camera main frame 1b to the camera head 1a, and contacts for informing the camera main frame 1b of the fact that the camera head 1a is connected.

Upper the mount section 10b there is disposed an AWB sensor 11b for detecting a light source type at the time of photography. What is meant by the light source type is a sort of light source, for example, sunlight and a fluorescent lamp. When the AWB sensor 11b detects the light source type, a suitable color temperature (for example, 6000K in case of sunlight, 4500K in case of fluorescent lamp) is set to a signal processing section (which will be described later), so that an adjustment of the optimum white balance is carried out. At the side of the AWB sensor 11b there is disposed a flash emission window 12b. Inside the camera main frame 1b there is disposed a flash emission section for emitting a flash through the flash emission window 12b. On the top of the body of the camera main frame 1b there are disposed a release button 13b and a mode dial 14b. The use of the mode dial 14b makes it possible to select a photographic mode and a regeneration mode. In the photographic mode, there is selected a mode between a still picture photographic mode and a dynamic picture photographic mode. The mode dial 14b is provided with a power source switch on a unitary basis. Operation of the mode dial 14b makes it possible to turn on the power source.

Hereinafter, there will be explained the internal structures of the camera head 1a and the camera main frame 1b.

Figure 2:
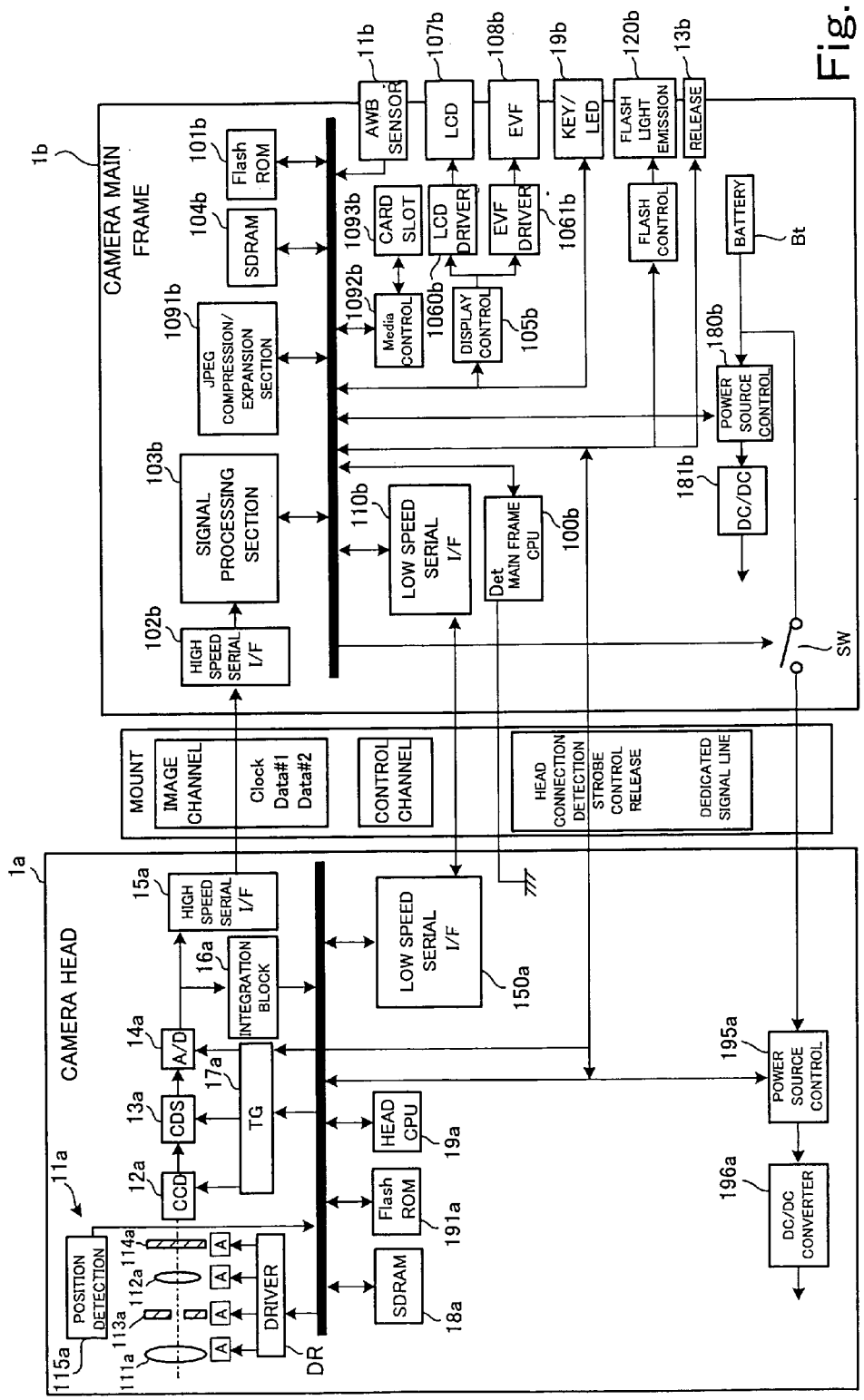
FIG. 2 is a block diagram of an electric system in a state that a camera head 1a is mounted on a camera main frame 1b.

FIG. 2 is a block diagram of an electric system in a state that a camera head 1a is mounted on a camera main frame 1b.

In FIG. 2, the left side and the right side show an electric system of the camera head 1a and an electric system of the camera main frame 1b, respectively.

Before explanation of the electric system of the camera head 1a and the electric system of the camera main frame 1b, there will be explained a structure as to a battery Bt as a power supply for operating the camera system.

The camera system 1 of the present embodiment operates the camera main frame 1b and the camera head 1a upon receipt of supply of electric power from the battery Bt of the camera main frame 1b.

In FIG. 2, there is shown a structure that a power source control section 180b is provided between the battery Bt and a DC/DC converter 181b of the camera main frame 1b, and when a switch of the power source control section 180b is connected by an operation of a power switch of a key/LED 19b, a power is supplied to the DC/DC converter 181b and is supplied from the DC/DC converter 181b to individual sections, so that the camera main frame 1b is in an operable state.

Thus, when the camera main frame 1b is in an operable state, a main frame CPU 100b, which controls the operation of the camera main frame 1b, is in an operable state. In the event that a ground signal (GND) is fed from the camera head 1a to a detection terminal (Det) of the main frame CPU 100b, the main frame CPU 100b detects the fact that the camera head 1a is mounted on the camera main frame 1b.

This structure makes it possible that when the camera head 1a is mounted on the camera main frame 1b and the power switch of the key/LED 19b turns on, the main frame CPU 100b detects the fact that the camera head 1a is mounted on the camera main frame 1b, and changes over the switch SW. Thus, it is possible to connect the battery Bt of the camera main frame 1b to a power source control section 195a and a DC/DC converter 196a of the camera head 1a. In the manner as mentioned above, when the power source switch turns on, an electric power is supplied from the battery Bt of the camera main frame 1b to the camera head 1a as well as the camera main frame 1b, so that the camera system, which comprises the camera main frame 1b and the camera head 1a, offers the operable state in its entirety.

Further, in the manner as mentioned above, when the main frame CPU 100b detects the attachment of the camera head 1a to the camera main frame 1b, so that power supply to the camera head 1a is automatically performed, the main frame CPU 100b can issue a transmission request of initialization information to the head CPU 19a using a low speed serial interface (hereinafter it is referred to as a serial I/F) 150a at the time of the turn-on of the power source. Upon receipt of the initialization information (configuration information that will be described later) transmitted from the head CPU 19a of the camera head 1a, the main frame CPU 100b can executes the initialization processing according to classification of the camera head 1a. In the event that a mode at the time when the power source turns on is a photographic mode, after the initialization processing is terminated, the main frame CPU 100b can also transmit to the camera head 1a, using the low speed serial I/F 110b, a transmission request of an image for display (hereinafter, it is referred to as a through picture) as well as the transmission request of initialization information. Hereinafter, an image signal representative of the through picture is referred to as a through picture signal.

When the head CPU 19a receives the transmission request of the through picture via the low speed serial I/F 150a, the head CPU 19a controls a timing generator (hereinafter it is referred to as TG) 17a to cause an image sensor (hereinafter it is referred to as CCD, since CCD solid state image sensor) 12a to generate the through picture signal at a predetermined frame rate.

Here, there will be explained details of structure and operation of the camera system 1.

As seen from FIG. 2, the camera head 1a of the camera system 1 has an image taking optical system 11a and CCD 12a. The image taking optical system 11a comprises a zoom lens 111a, a focus lens 112a, an aperture 113a, and a shutter 114a. After an electric power is supplied from the camera main frame 1b to the camera head 1a, when it is informed from the camera main frame 1b via the low speed serial I/F 150a that the photographic mode is concerned, the shutter 114a is driven by a driver DR so that a light receiving plane of the CCD 12a opens to offer a photography standby state.

When the main frame CPU 100b receives the transmission request of the through picture signal, the main frame CPU 100b controls the TG 17a so that exposure start signal and exposure termination signal are fed to the CCD 12a to initiate generation of image data. At that time, the TG 17a also feeds a timing signal to a CDS 13a and an A/D section 14a to establish a timing of processing of the image signal. The CDS 13a performs reduction of noises. The A/D section 14a performs a conversion from analog RGB signals to digital RGB signals, and transmits the converted digital RGB signals via a high speed serial I/F 15a to the camera main frame 1b. The CDS 13a further transmits the converted digital RGB signals to an integrating block 16a to initiate focusing and exposure adjusting.

To create the through picture, it is necessary that a clear image, which is focused and adjusted in exposure, is formed on the light receiving plane of the CCD 12a. Accordingly, the head CPU 19a controls a position of a focus lens 111a and an aperture caliber of an aperture 113a through instructing the driver DR in accordance with an exposure control result and a focusing detection result by the integrating block 16a so that a clear image, which is focused and adjusted in exposure, is always formed on the light receiving plane of the CCD 12a. To dispose the focus lens 111a at the focusing position, when the head CPU 19a receives a position signal from a position detection section 115a and decides that the focus lens 111a is disposed at the focusing position, the head CPU 19a instructs the driver DR to stop driving of the focus lens 111a.

According to the present embodiment, a CDS 13a outputs the through picture signal from the CCD 12a at the frame rate of 1/30 sec. in synchronism with the timing signal from the TG 17a to perform processing for noise reduction. Thereafter, the A/D section 14a converts an analog through picture signal to a digital through picture signal, and transmits the converted digital through picture signal via the high speed serial I/F 15a to the camera main frame 1b. The digital through picture signal is transmitted from the camera head 1a via both the high speed serial I/F 15a and the high speed serial I/F 102b to the camera main frame 1b. Of the image signals which are fed via the high speed serial I/F 15a and the high speed serial I/F 102b to the camera main frame 1b, there are an image signal (hereinafter it is referred to as a still picture signal) representative of a still picture obtained through an operation of the release button 13b when the still picture photographic mode of the photographic mode is selected, and an image signal (hereinafter it is referred to as a dynamic picture signal) representative of a dynamic picture obtained through an operation of the release button 13b when the dynamic picture mode of the photographic mode is selected, as well as the through picture signal for displaying on a LCD panel and a EVF (Electrical View Finder) the subject caught by an image taking lens of the image taking optical system when the photographic mode is selected by the mode dial 14b. Anyone of those image signals is transmitted via the high speed serial I/F 15a and the high speed serial I/F 102b to the camera main frame 1b in accordance with a request of the camera main frame 1b. The high speed serial I/F 15a and the high speed serial I/F 102b have a clock line (CLK) for supplying clocks for synchronization and two channels of image data lines (DATA #1 and DATA #2).

A Flash ROM 191a stores a program indicative of procedures of operation of the camera head 1a, and configuration information of the camera head 1a as well. When the camera head 1a receives a command representative of the transmission request of the initialization information from the camera main frame 1b via the low speed serial I/F 110b and the low speed serial I/F 150a, the configuration information stored in the Flash ROM 191a is transmitted via the low speed serial I/F 110b and the low speed serial I/F 150a to the camera main frame 1b. Details of the configuration information will be described later.

The low speed serial I/F 110b and the low speed serial I/F 150a serve to transfer commands between the camera main frame 1b and the camera head 1a at the time of photography. For example, when the camera head 1a receives from the camera main frame 1b a command associated with a request of transmission of an image signal (either one of the through image signal, the still picture image, and the dynamic picture signal) via the low speed serial I/F 110b and the low speed serial I/F 150a, the image signal (either one of the through image signal, the still picture image, and the dynamic picture signal), which is the digital signal, is transmitted to the camera main frame 1b via the high speed serial I/F 15a and the high speed serial I/F 102b rather than the low speed serial I/F 150a and the low speed serial I/F 110b. In FIG. 2, it is denoted by a word addressed as an image channel that an image signal is transmitted from the camera head to the camera main frame via the high speed serial I/F coupling the camera head and the camera main frame, it is denoted by a word addressed as a control channel that a control signal is transferred via the low speed serial I/F between the camera head and the camera main frame, and it is denoted by a word addressed a dedicated line that a release signal is transmitted from a release button via a dedicated line.

In this manner, when the camera head 1a is mounted on the camera main frame 1b to constitute the camera system 1, so that the camera system 1 performs photography.

Hereinafter, there will be explained an operation of the camera main frame 1b where the camera head 1a is mounted on the camera main frame 1b.

The operation of the camera main frame 1b is controlled by the main frame CPU 100b in accordance with a procedure of a program of a Flash ROM 101b in a similar fashion to that of the camera head 1a.

According to the camera system 1 of the present embodiment, as mentioned above, when electric power is supplied from the battery Bt of the camera main frame 1b to both the camera head 1a and the camera main frame 1b, first, the transmission request of the initialization processing information is transmitted via the low speed serial I/F 110b to the camera head 1a in accordance with the control of the main frame CPU 100b. When the camera head 1a receives the initialization processing information from the camera head 1a, the main frame CPU 100b performs the initialization processing in accordance with the initialization processing information.

Next, a command indicative of the request of transmission of the through picture signal is transmitted via the low speed serial I/F 110b to the camera head 1a in accordance with the control of the main frame CPU 100b. Upon receipt of the request of transmission of the through picture signal, the head CPU 19a of the camera head 1a controls the TG 17a to supply a timing signal for through picture signal creation to the CCD 12a for each a predetermined time. Thus, the through picture signal is sequentially transmitted via the high speed serial I/F 15a and the high speed serial I/F 102b to the camera main frame 1b in accordance with the timing signal from the TG 17a.

The through picture signal, which is sequentially transmitted via the high speed serial I/F 15a and the high speed serial I/F 102b to the camera main frame 1b, is fed to a signal processing section 103b to apply the signal processing according to the configuration information of the camera head 1a. The through picture signal, which is subjected to the signal processing by the signal processing section 103b, is sequentially stored in a SDRAM 104b. The through picture signal, which is sequentially stored in the SDRAM 104b at a predetermined frame rate, is sequentially fed to a display control section 105b so that a through picture is displayed on a display panel of a LCD 107b in accordance with a control of the display control section 105b. At that time, the through picture signal is also fed to an EVF 108b so that a through picture is displayed according to the through picture signal.

When an operator depresses the release button 13b while looking at the through picture on the screen of the LCD 107b or the screen of the EVF 108b, the release signal is fed to the main frame CPU 100b, and also is fed to the head CPU 19a. The release button 13b of the camera main frame 1b has two operating modes of half-depression and full-depression. The head CPU 19a operates the integrating block 16a in response to the operation of the half-depression to initiate photometry and focusing so as to compute a photometric value and a focusing value. And the head CPU 19a issues an instruction to the driver DR in accordance with the computed values so that an actuator A is driven to move the focus lens 112a and control the aperture caliber of the aperture 113a. Thereafter, the head CPU 19a serves to supply an exposure start signal from the TG 17a to the CCD 12a in response to the operation of the full-depression, so that the CCD 12a initiates the exposure. After the lapse of a predetermined time, the head CPU 19a supplies an exposure termination signal from the TG 17a to the CCD 12a to output an image signal representative of a still picture.

Thus, the image signal, which is read from the CCD 12a, is fed via the high speed serial I/F 15a and the high speed serial I/F 102b to the signal processing section 103b of the camera main frame 1b to apply a predetermined signal processing to the image signal. The image signal, which is subjected to the signal processing, is fed to a JPEG compression/expansion section 1091b. The JPEG compression/expansion section 1091b compresses the image signal and then supplies compression information as to the compression and the compressed image signal to a Media control section 1092b to store the compressed image signal in a memory card of a memory card slot 1093b.

The signal processing section 103b performs signal processing which is necessary for creation of color signals such as an OB (Optical Balance) correction and AWB (Auto White Balance). Hereinafter, there will be briefly explained the operational contents of the signal processing section 103b.

The OB correction section derives a signal of an area (see FIG. 4), which is concerned with an optical black, in form of a signal indicative of a black level, and defines the derived signal as a pedestal level of a luminance signal. On the other hand, there is performed an AWB (for example, an adjustment of an additive white level) according to the color temperature according to the light source type detected by the AWB sensor 11b shown in FIG. 1. Thus, making sure of the range of luminance signal from black to white, so-called a dynamic range, makes it possible to adequately perform a level adjustment of halftone, so that a LMTK (Linear Matrix: color conversion matrix) performs a tone correction.

A γ-correcting section performs a gradation correction to obtain the optimal signal for display. The signal is converted into YC signal (a luminance signal) and CrCb (a color difference signal) so that an outline correction and a color difference correction are performed.

The image signals, which are subjected to the signal processing as mentioned above, are fed to the JPEG compression/expansion section 1091b.

When the JPEG compression/expansion section 1091b receives the color image signal, the color image signal is subjected to the JPEG compression and then recorded on a card of a card slot 1093b in accordance with a control of the Media control section.

A flash section 120b emits a flash when it is decided through photometry by the integrating block 16a that a field is dark. A flash control section 121b controls an emission of the flash. The AWB sensor 11b detects a light source type at the time of photography.

Figure 3:
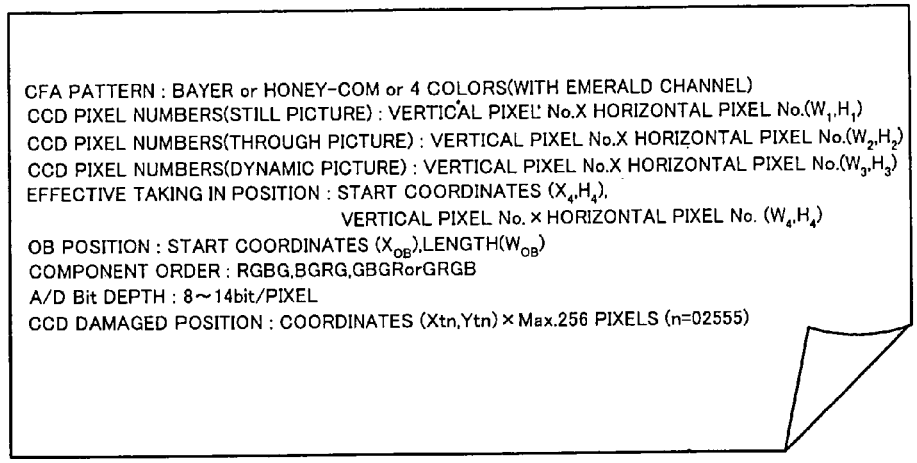
FIG. 3 is a view useful for understanding configuration information transmitted from a camera system in form of information for an initialization.
Figure 4:
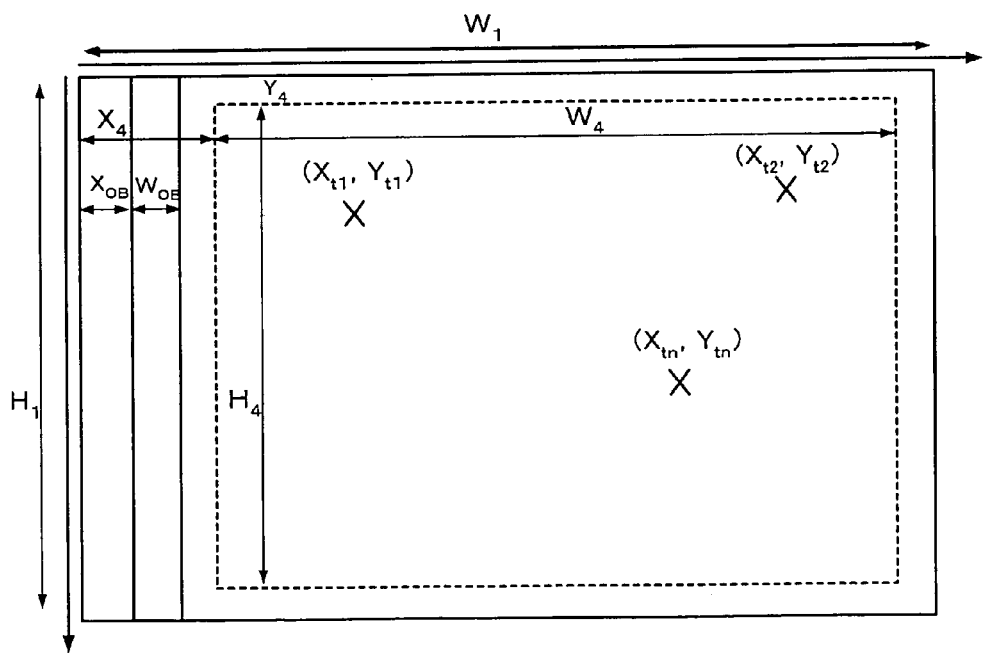
FIG. 4 is a view useful for understanding meaning of codes of the configuration information.

FIG. 3 is a view useful for understanding configuration information transmitted from a camera system in form of information for an initialization. FIG. 4 is a view useful for understanding meaning of codes of the configuration information. A processing parameter of the signal processing section 103b is set up in accordance with the configuration information.

As the configuration information shown in FIG. 3, there are raised: an arrangement of a color filter array (hereinafter it is referred to as "CFA") of the CCD 12a; the number of pixels of CCD 11a (three cases of still picture, through picture, and dynamic picture); coordinates and the number of pixels indicative of the effective taking-in position; coordinates indicative of a position of an optical black (OB) that is a basis of a black level; components order; A/D bit depth; and the number of pixels of damaged CCD.

Of the configuration information shown in FIG. 4, the number of pixels is represented by a combination (W, H) of the number of vertical pixels (W) and the number of horizontal pixels (H). As shown in FIG. 4, the combination (W, H) represents the number of vertical pixels (W) and the number of horizontal pixels (H). The mark W1 denotes the maximum number of pixels on the imaging plane in the width direction. The mark H1 denotes the maximum number of pixels on the imaging plane in the height direction. In case of (W1, H1), it is denoted that all the pixels of the CCD 12a are used to generate a still picture signal, as a piece of configuration information. As a piece of configuration information, it is denoted that the through signal is created with the number of pixels (W2, H2), which is less than the number of pixels (W1, H1), of the still picture signal, and the dynamic picture signal is also created with the number of pixels (W3, H3), which is less than the number of pixels (W1, H1) of the still picture signal. It is shown that coordinates of the effective taking-in position for the through picture signal and the dynamic picture signal are denoted by (X, Y), and the number of pixels in an effective taking-in area (an area shown with a dotted line) is expressed by a combination of (W4, H4).

On the imaging plane of the CCD 12b, there is provided an optical black (OB) for informing the signal processing section 103b of the camera main frame 1b of the black level where photography is carried out by the CCD 12b. There are also shown start coordinates (XOB) of the OB area and the length (WOB) as a piece of configuration information.

Further, there is shown what the number of bits constitutes one pixel in depth of A/D bit, as a piece of configuration information. The number of bits on one pixel is 8 bits to 14 bits, and is denoted as a piece of configuration information. Coordinate positions (X, Y) of a damaged pixel are also denoted as a piece of configuration information by CCD damage position. In FIG. 4, it is denoted that there are the damaged pixels at three places of (Xt1,Yt1), (Xt1,Yt1), (Xt1, Yt1). In the event that a damaged pixel is detected, pixels, which are adjacent to the damaged pixel are used to perform interpolation processing.

When the configuration information is set to the signal processing section 103b of the camera main frame 1b and an image signal is transmitted via the high speed serial I/F, processing according to properties of the camera head 1a is applied to the transmitted image signal.

Thus, the camera head is mounted on the camera main frame to constitute the camera system.

According to the camera system of the present embodiment, the camera head and the camera main frame have a head adapter and a main frame adapter each having a radio communication section, respectively, so that remote photography can be performed through the camera head 1a in accordance with the operation of the camera main frame 1b side even if the camera head 1a is separated.

Figure 5:
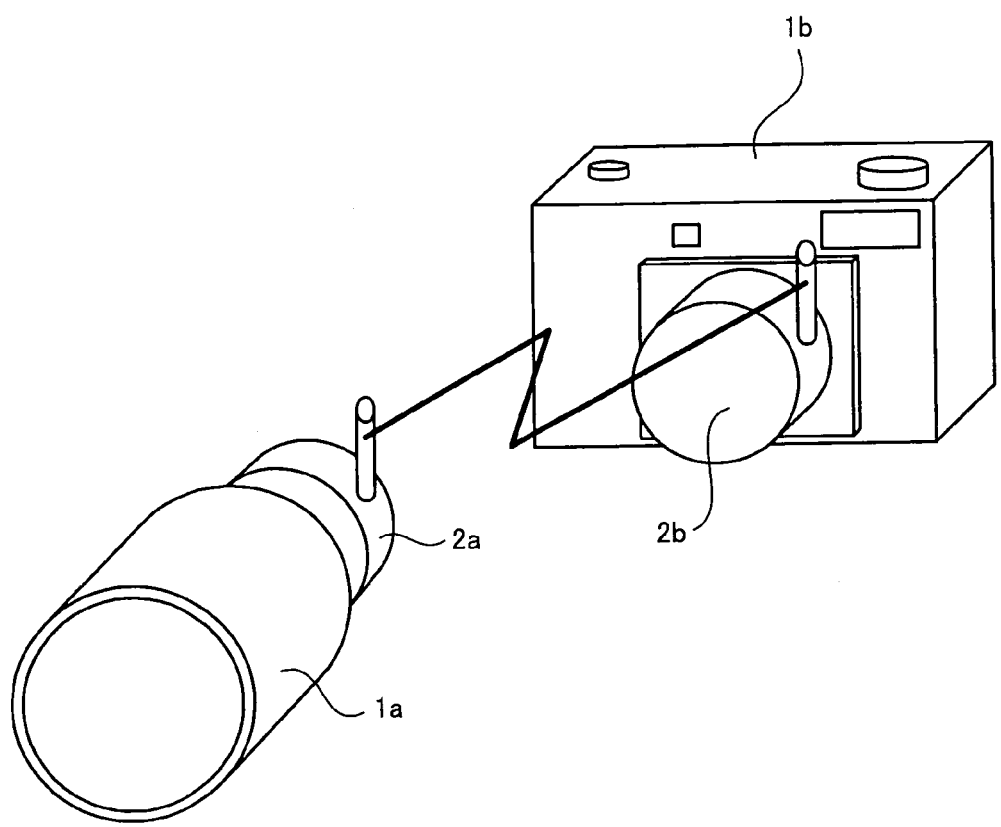
FIG. 5 is a perspective view of a camera system for performing a remote control photography, wherein the camera head 1a and the camera main frame 1b, which constitutes the camera system shown in FIG. 1, are separated from one another, and an operating signal is transmitted on a radio communication basis from the camera main frame 1b to the camera head 1a so that a remote control photography is performed.

FIG. 5 is a perspective view of a camera system for performing a remote control photography, wherein the camera head 1a and the camera main frame 1b, which constitutes the camera system shown in FIG. 1, are separated from one another, and an operating signal is transmitted on a radio communication basis from the camera main frame 1b to the camera head 1a so that a remote control photography is performed.

A camera system shown in FIG. 5 comprises: a camera head 1a having an image taking optical system and an image sensor wherein the camera head 1a is separated from a camera main frame 1b; the camera main frame 1b on which the camera head 1a is detachably mounted, the camera main frame 1b being adapted to receive an image signal from the attached camera head 1a and to perform signal processing; a head adapter 2a that is detachably mounted on the camera head 1a separated from the camera main frame 1b, instead of the camera main frame 1b; and a main frame adapter 2b that is detachably mounted on the camera main frame 1b from which the camera head 1a is separated, instead of the camera head 1a.

Figure 6:
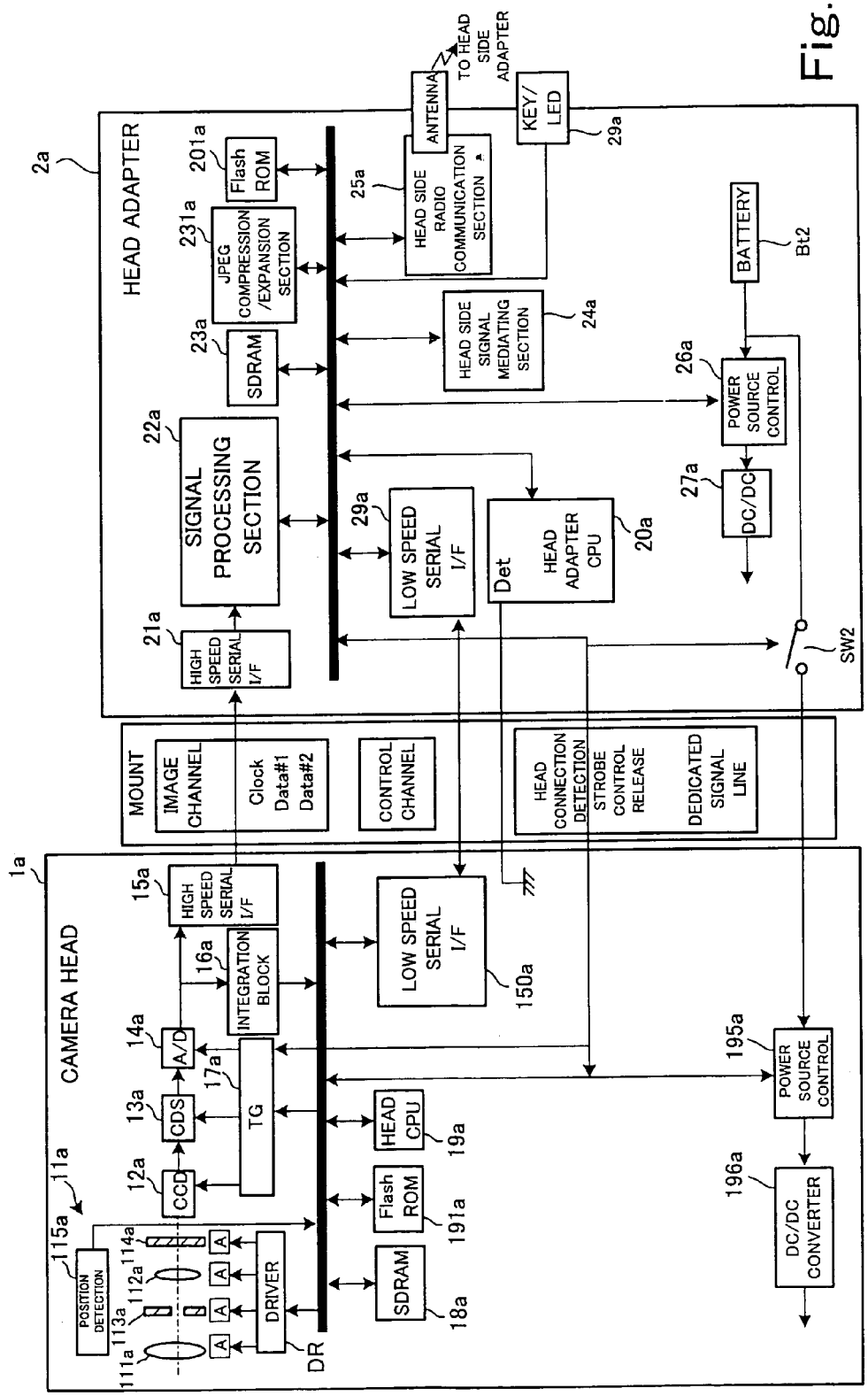
Figure 7:
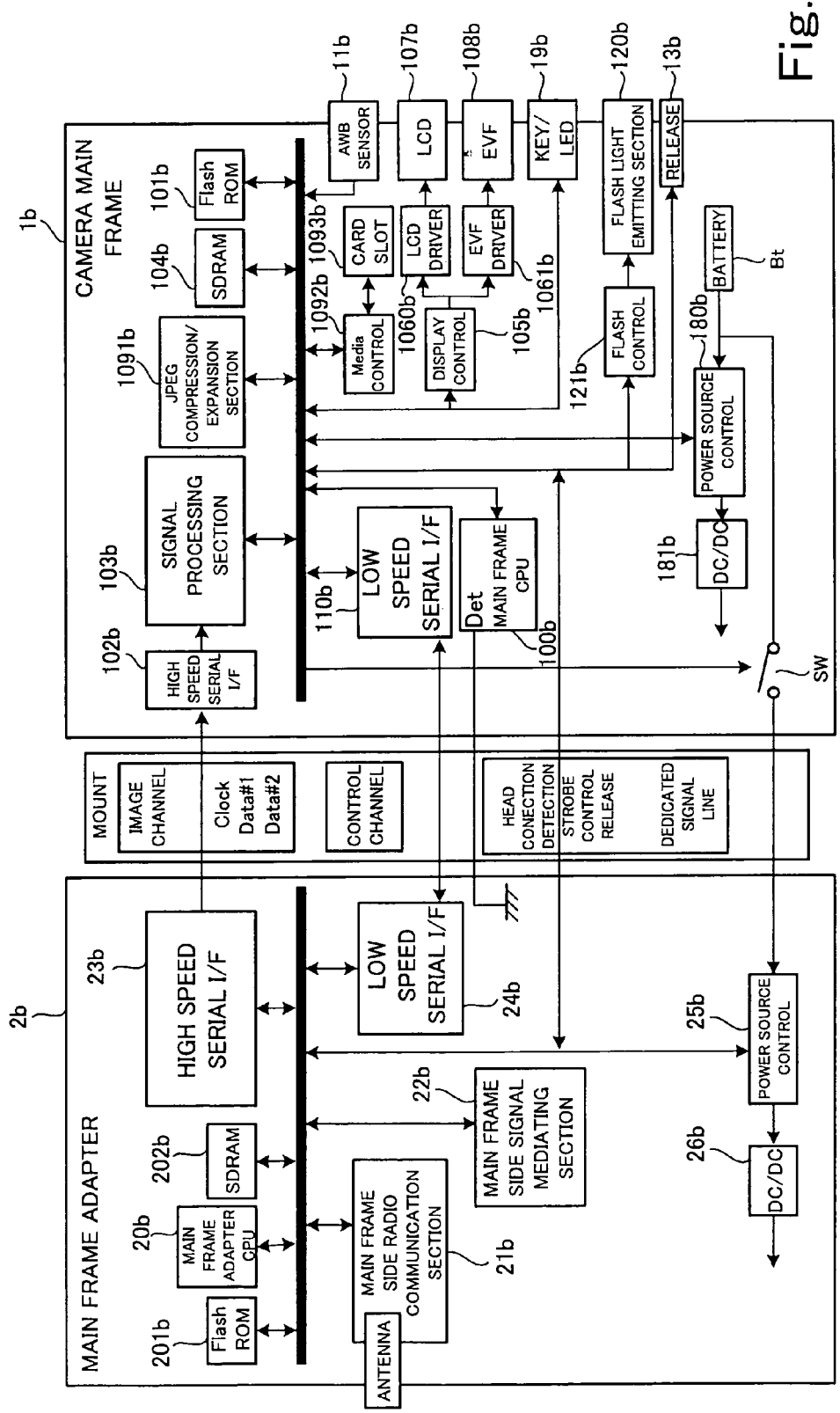
FIG. 7 is an internal structural view of the main frame adapter 2b mounted on the camera main frame 1b.

FIG. 6 is an internal structural view of the head adapter 2a mounted on the camera head 1a. FIG. 7 is an internal structural view of the main frame adapter 2b mounted on the camera main frame 1b.

The head adapter 2a shown in FIG. 6 comprises: a head side radio communicating section 25a for performing a radio communication between the head adapter 2a and the main frame adapter 2b; and a head side signal mediating section 24a for converting a format of a signal to be transferred between the camera head 1a and the head side radio communicating section 25a to mediate the signal to be transferred between the camera head 1a and the head side radio communicating section 25a. The main frame adapter 2b shown in FIG. 7 comprises: a main frame side radio communicating section 21b for performing a radio communication between the head adapter 2a and the main frame adapter 2b; and a main frame side signal mediating section 22b for converting a format of a signal to be transferred between the camera main frame 1b and the main frame side signal mediating section 21b to mediate the signal to be transferred between the camera main frame 1b and the main frame side signal mediating section 21b.

First, there will be explained the structure of head adapter 2a.

The head adapter 2a shown in FIG. 6 has a battery Bt2. When the head adapter 2a is mounted instead of the main frame 1b, in a similar fashion to that of the main frame 1b, the battery Bt2 feeds electric power to the camera head 1a.

The head adapter 2a has, in a similar fashion to that of the main frame 1b, a high speed serial I/F 21a for image signal communication with the camera head 1a and a low speed serial I/F 29a for control signal communication.

The high speed serial I/F 21a and the low speed serial I/F 29a are connected via a bus to a head adapter CPU 20a. Connected to the bus are also a Flash ROM 201a for storing a program indicative of processing procedure of programs and a SDRAM 23a as a buffer memory.

Accordingly, the head adapter CPU 20a controls the high speed serial I/F 21a in accordance with the processing procedure of the Flash ROM 201a to receive an image signal from the camera head 1a and supply the image signal to a signal processing section 22a, so that an image signal, which is subjected to signal processing by the signal processing section 22a, is temporarily stored in the SDRAM 23a.

For example, in the event that the SDRAM 23a stores a frame of image signals, it is possible to read the image signals from the SDRAM 23a to supply the same to a JPEG compression/expansion section 231a, so that the image signals are compressed and then supplied to the head side signal mediating section 24a, or alternatively to directly supply the image signals to the head side signal mediating section 24a without supplying to the JPEG compression/expansion section 231a. The feature makes it possible that when a transmission capacity, that is, the number of bits for transmission per second, of a head side radio communication section 25a, is small, the image signal subjected to JPEG compression is converted into a signal that is suitable to the radio transmission, and then be transmitted, or alternatively when the transmission capacity is acceptable to transmit the image signal without compression, the image data (RAW data) generated in the CCD 12a is converted into a signal suitable to the radio transmission without compression, and then be transmitted.

In the event that the image signal, which is the RAW data, is transmitted to the camera main frame 1b when the transmission capacity of both the radio communication sections is small, there is a possibility that it is difficult to perform a display through switching the through image on the display screen for every 1/30 sec. because of an increment of too many bit number. Thus, according to the present embodiment, there is arranged in such a manner that the selective processing can be performed. The head adapter 2a has a KEY/LED 29a for operation. Operation of the KEY/LED 29a makes it possible, for example, to perform a photography instruction.

Next, there will be explained the structure of the main frame adapter 2b referring to FIG. 7.

The main frame adapter 2b shown in FIG. 7 is mounted on the camera main frame 1b instead of the camera head 1a, and is operable through power supply from the camera main frame side in a similar fashion of the camera head.

The main frame adapter 2b has a main frame adapter CPU 20b for controlling the operation of the main frame adapter 2b, a high speed serial I/F 23b for an image signal communication between the camera main frame 1b and the main frame adapter 2b, and a low speed serial I/F 24b for a control signal communication.

The high speed serial I/F 23b and the low speed serial I/F 24b are connected via a bus to the main frame adapter CPU 20b, and also connected via the bus to a Flash ROM 201b storing a program indicative of a processing procedure and a SDRAM 202b as a buffer memory.

Accordingly, in order that the main frame adapter CPU 20b receives an image signal from the camera head 1a in accordance with the processing procedure stored in the Flash ROM 201b, the main frame adapter CPU 20b control a main frame side radio communication section 21b to temporarily store a received image signal in the SDRAM 202b.

After the SDRAM 202b stores a page of image signal, a page of image signal is read from the SDRAM 202b and is supplied to the main frame side signal mediating section 22b. The main frame side signal mediating section 22b converts the image signal having a signal format suitable for radio communications into a signal having a signal format of an image signal created on the CCD 12a of the camera head 1a, and then the image signal is supplied via the high speed serial I/F 23b to the camera main frame 1b.

As mentioned above, in the event that the radio communication sections of the head adapter 2a and the main frame adapter 2b are small in the transmission capacity, it happens that a compressed through image signal (hereinafter, it is referred to as a compressed through image signal) is transmitted from the camera head 1a to the camera main frame 1b. In case of the compressed through image signal, it is directly stored in the SDRAM passing through the signal processing section, and then expanded in the JPEG compression/expansion section and restored to the original state. In case of the non-compressed through image signal, the signal processing section performs the necessary processing to obtain the through image signal. In case that the head adapter performs the necessary processing, there is obtained the through image signal without passing through the signal processing section. Thereafter, the restored through image signal is fed to the display control section 105b so as to perform the image display of the through picture.

In the event that the release button 13b is depressed while the image display of the through picture is performed in accordance with the display control section 105b, a release signal is transmitted from the camera main frame 1b via the main frame side radio communication section 21b and the head side radio communication section 25a to the camera head 1a so that the still picture signal, which is generated in the CCD 12a of the camera head side in accordance with the release signal, is transmitted on a radio basis to the camera main frame. The still picture signal is received by the main frame side radio communication section 21b and temporarily stored in the SDRAM 202b. After the SDRAM 202b completely stores the still picture signal, the still picture signal is read from the SDRAM 202b and fed via the high speed serial I/F 15a to the camera main frame 1b. Thereafter, the signal processing section 103b performs the signal processing for the still picture signal. The JPEG compression/expansion section 1091b performs the compression for the still picture signal which is subjected to the signal processing. The Media control section 1092b causes the compressed still picture signal to be stored in a memory card of a card slot together with compression information.

Thus, when the control signal such as the release signal is transmitted from the camera main frame 1b to the main frame adapter 2b, the head adapter 2a and the camera head 1a, and when a response signal to the control signal, the still picture signal and the dynamic picture signal are transmitted from the camera head 1a, in a state that the camera head 1a is separated from the camera main frame 1b, there is a need to perform an initialization for the main frame adapter 2b and the head adapter 2a as well as the camera main frame 1b and the camera head 1a.

In other words, in the event that photography according to the remote control is performed in a state that the camera head 1a is separated from the camera main frame 1b, there are needed initialization information for both the main frame adapter and the head adapter as well as the configuration information shown in FIG. 3.

Figure 8:
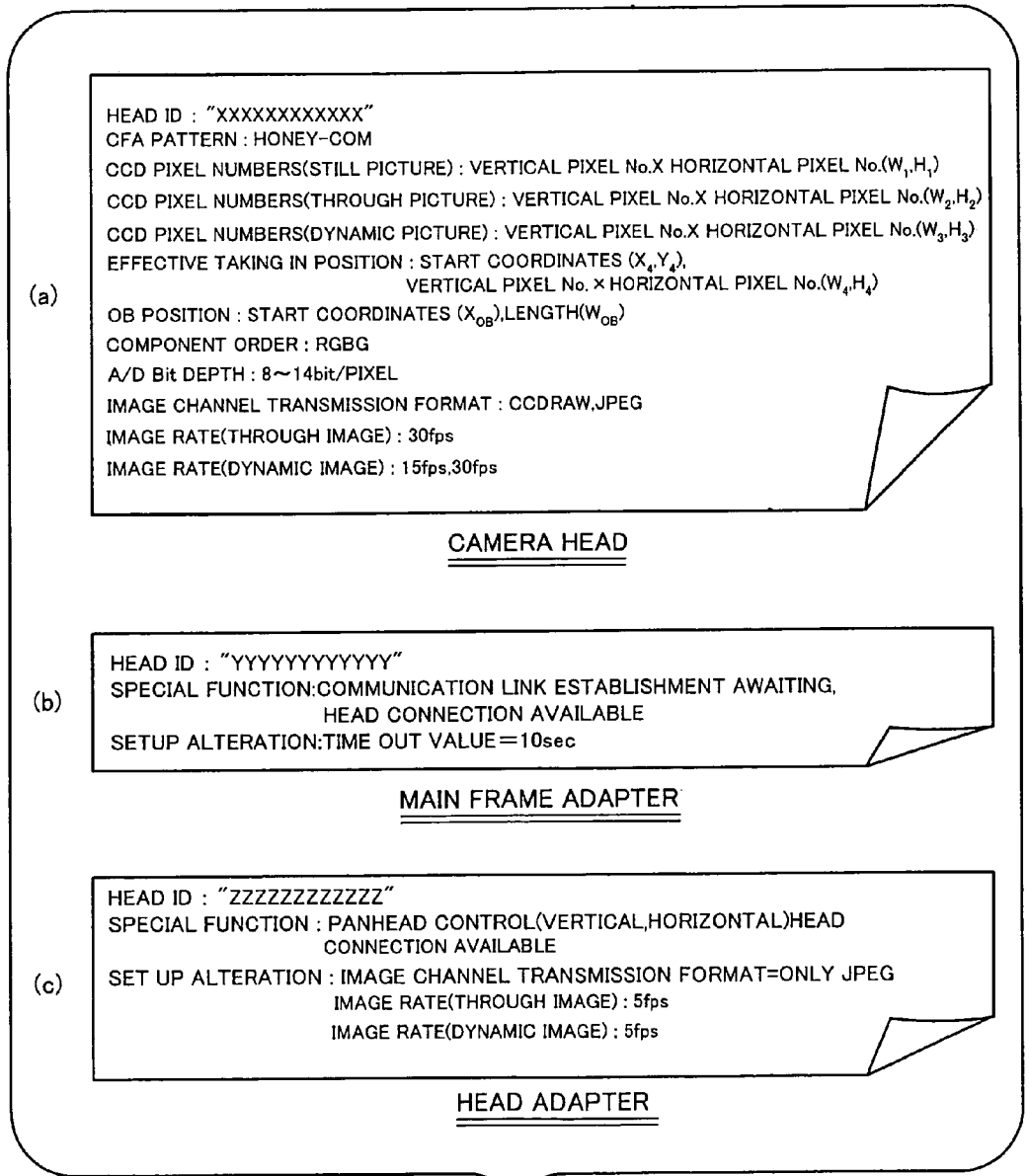
FIG. 8 is an explanatory view useful for understanding configuration information of a camera head on which a head adapter is mounted.

FIG. 8 is an explanatory view useful for understanding configuration information wherein the head adapter 2a is mounted on the camera head 1a and the main frame adapter 2b is mounted on the camera main frame 1b.

In the event that photography is performed in a state that the camera head 1a is separated from the camera main frame 1b so as to perform photography according to the remote control, in order that the camera main frame 1b performs initialization processing, there are needed initialization information of the main frame adapter shown in part (b) of FIG. 8 and initialization information of the head adapter shown in part (c) of FIG. 8.

Here, there will be briefly explained contents of the added configuration information.

As mentioned above, in some transmission capacity of the head side radio communication section and the main frame side radio communication section, it is obliged to transmit the compressed image signal in the through image signal. Accordingly, as shown in part (a) of FIG. 8, as the configuration information of the camera head, there is added a transmission format of an image channel (either one of an image signal consisting of RAW data and an image signal subjected to the JPEG compression). Further, as the initialization information of the camera head, there are also added a frame rate: 30 fps (frame/sec) that is necessary for the through image processing of the camera main frame where the through image signal is transmitted, a frame rate of a dynamic image.

Further, the part (b) of FIG. 8 shows initialization information of the main frame adapter necessary for an initialization by the camera main frame. As the initialization information, there are shown time out value (e.g. 10 sec) that is necessary for determining a failure of the radio communication of the main frame adapter side with the head adapter side, and information indicative of whether the connection of the camera head is available. The part (c) of FIG. 8 shows the initialization information of the head adapter necessary for an initialization by the camera main frame wherein there are shown special functions (for example, a panhead function which will be described later).

The camera main frame obtains the initialization information of the camera head shown in the part (a) of FIG. 8 and the initialization information of the head adapter shown in the part (c) of FIG. 8 through the radio communication sections of the head adapter 2a and the main frame adapter 2b so that the camera main frame can perform the initialization in accordance with the type of the camera head 1a and the head adapter 2a mounted on the camera head 1a.

To perform the initialization by the camera main frame, it is acceptable that: pieces of the initialization information shown in the parts (a) to (c) of FIG. 8 are combined to perform the initialization; the initialization of the main frame adapter shown in the part (b) of FIG. 8, the initialization of the head adapter shown in the part (c) of FIG. 8, and the initialization of the camera head shown in the part (a) of FIG. 8 are sequentially performed in the named order; or alternatively, for the time being, the initialization of the camera main frame as well as the main frame adapter is performed, and then the initialization information of the camera head and the initialization information of the head adapter are obtained to do over again the initialization including the main frame adapter.

As mentioned above, according to the present embodiment, it is possible to implement a convenient camera system capable of performing photography, even if the camera head 1a is mounted on the camera main frame 1b, or even if the camera head 1a is separated from the camera main frame 1b.

Now there will be explained the initialization processing, which is performed in the camera main frame 1b when the main frame adapter 2b is mounted on the camera main frame 1b.

As mentioned above, in order that the camera main frame 1b performs the initialization processing when the camera head 1a is separated from the camera main frame 1b, there is a need to obtain initialization information of the camera head 1a, initialization information of the head adapter 2a, and initialization information of the main frame adapter 2b, so that the initialization processing is performed in accordance with their characteristics. Thus, the initialization is carried out in accordance with the procedure as shown in FIG. 9.

Figure 9:
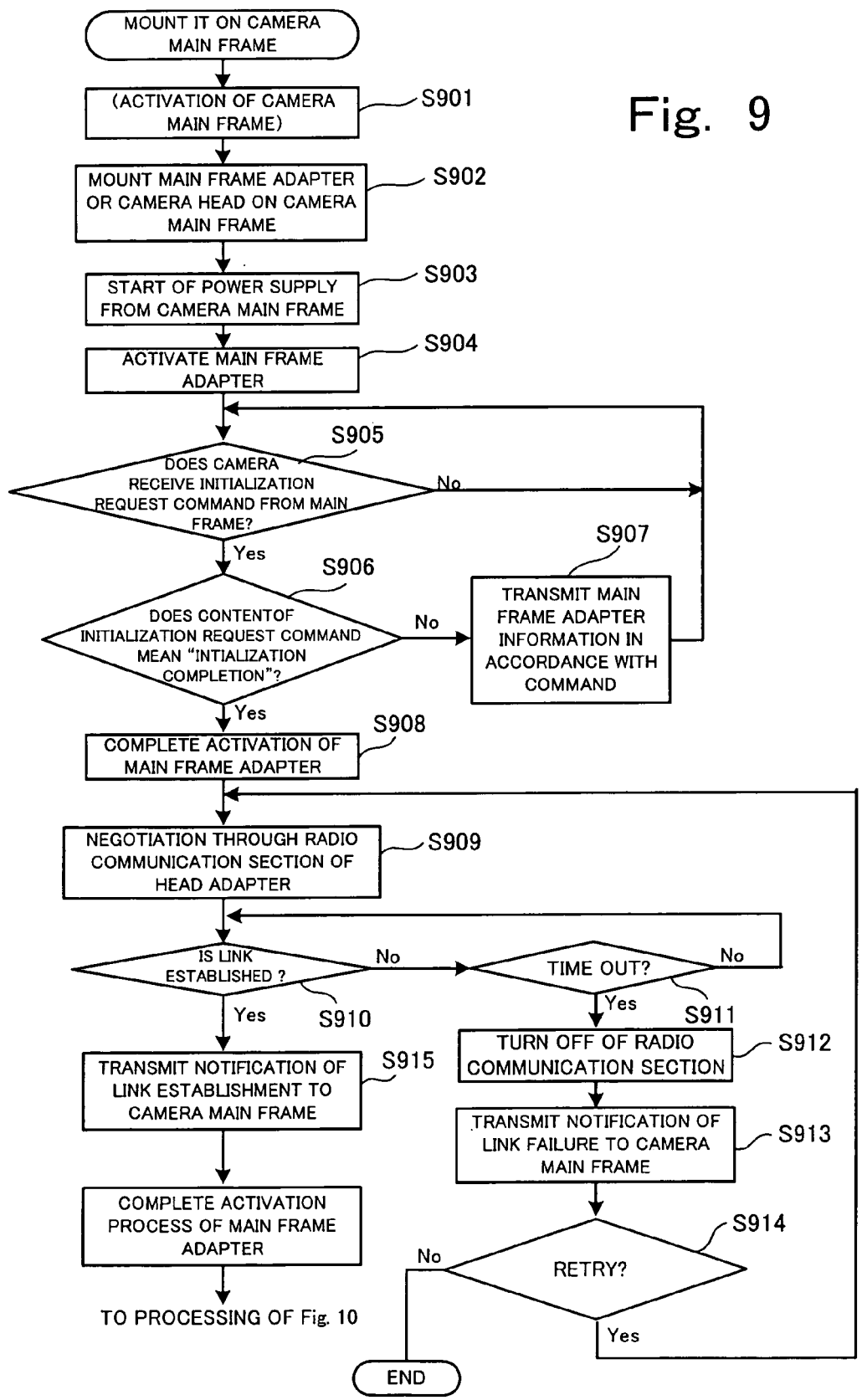
FIG. 9 is a flowchart useful for understanding a procedure of an initializing processing that is to be carried out by a main frame CPU 100b of the main frame adapter 2b or a main frame adapter CPU 20b of the main frame adapter 2b when the main frame adapter 2b is mounted on the camera main frame 1b.

FIG. 9 is a flowchart useful for understanding a procedure of an initializing processing that is to be carried out by a main frame CPU 100b of the camera main frame 1b or a main frame adapter CPU 20b of the main frame adapter 2b when the main frame adapter 2b is mounted on the camera main frame 1b.

In the flowchart shown in FIG. 9, the terms "transmit" and "receive" denote transmit and receive through the communication using the low speed serial I/F, respectively, and the term "link" denotes transmit and receive through the radio communication using both the radio communication section. Turn-on of the power switch of the camera main frame serves to activate both the camera main frame 1b and the main frame adapter 2b. In order to clarify that when the power switch turns on, first, only the camera head 1a is activated step S901 uses the words "activation of camera main frame".

When the power switch turns on in the step S901, the process goes to a step S902 in which the main frame CPU 100b receives a GND signal from the main frame adapter 2b to detect attachment of the main frame adapter 2b. Upon receipt of the detection, the main frame CPU 100b turns on the switch SW to start the power supply to the main frame adapter 2b (step S903). In step S904, upon receipt of the power supply, the main frame adapter CPU 20b activates the main frame adapter 2b.

Of course, it is acceptable that the camera main frame 1b is first activated and then the main frame adapter 2b is mounted. In this case, the camera main frame 1b investigates the attachment of the camera head 1a (or the main frame adapter 2b, and when the camera main frame 1b detects the attachment of the camera head 1a, the camera main frame 1b performs the processing after the power supplying start (step S903).

Next, the process goes to a step S905 in which it is decided whether the main frame adapter CPU 20b receives an initialization request command from the camera main frame 1b. When it is decided that the main frame adapter CPU 20b does not receive the initialization request command, the process returns to the step S905 in which the processing is repeated. When it is decided that the main frame adapter CPU 20b receives the initialization request command, the process goes to a step S906 in which the main frame adapter CPU 20b determines whether the content of the received initialization request command means "initialization completion". When it is decided that the main frame adapter CPU 20b decides that the content of the initialization request command does not mean "initialization completion", the process goes to a step S907 in which information as to the main frame adapter 2b is transmitted to the camera main frame 1b, and returns to the step S905 to repeat the processing of the step S905 and the step S906.

In the step S906, when it is decided that the main frame adapter CPU 20b decides that the content of the initialization request command means "initialization completion", the process goes to a step S908 in which the initialization processing for the camera main frame 1b including the main frame adapter 2b is completed, and then goes to a step S909 in which the main frame side radio communication section 21b of the main frame adapter 2b is activated.

In the step S909, there is established communications between the main frame side radio communication section 21b of the main frame adapter 2b and the head side radio communication section 25a of the head adapter 2a.

Next, the process goes to a step S910 in which when it is decided that negotiations are completed to establish the link, the process goes to "Yes" side, and when it is decided that negotiations are not yet completed, the process goes to "No" side. When the process goes to "No" side, in a step S911, the main frame adapter CPU 20b determines whether the time out occurs on the main frame side radio communication section 21b. When the main frame adapter CPU 20b decides the time out does not occur, it is determines that the link is not yet established, and the process returns to the step S910. In the step S911, it is decided that the tide out occurs, the process goes to a step S912 in which the radio communication section turns off, and goes to a step S913 in which a notification signal, which is indicative of the fact that the link to the camera main frame 1b is failure, is transmitted via the low speed serial I/F 24b. In a step S914, there is displayed "link failure, retry?" on the display screen. When "Yes" is designated through the key operation, the process returns to the step S909 to repeat the processing. When "No" is designated through the key operation, the processing of the flow is terminated.

Figure 10:
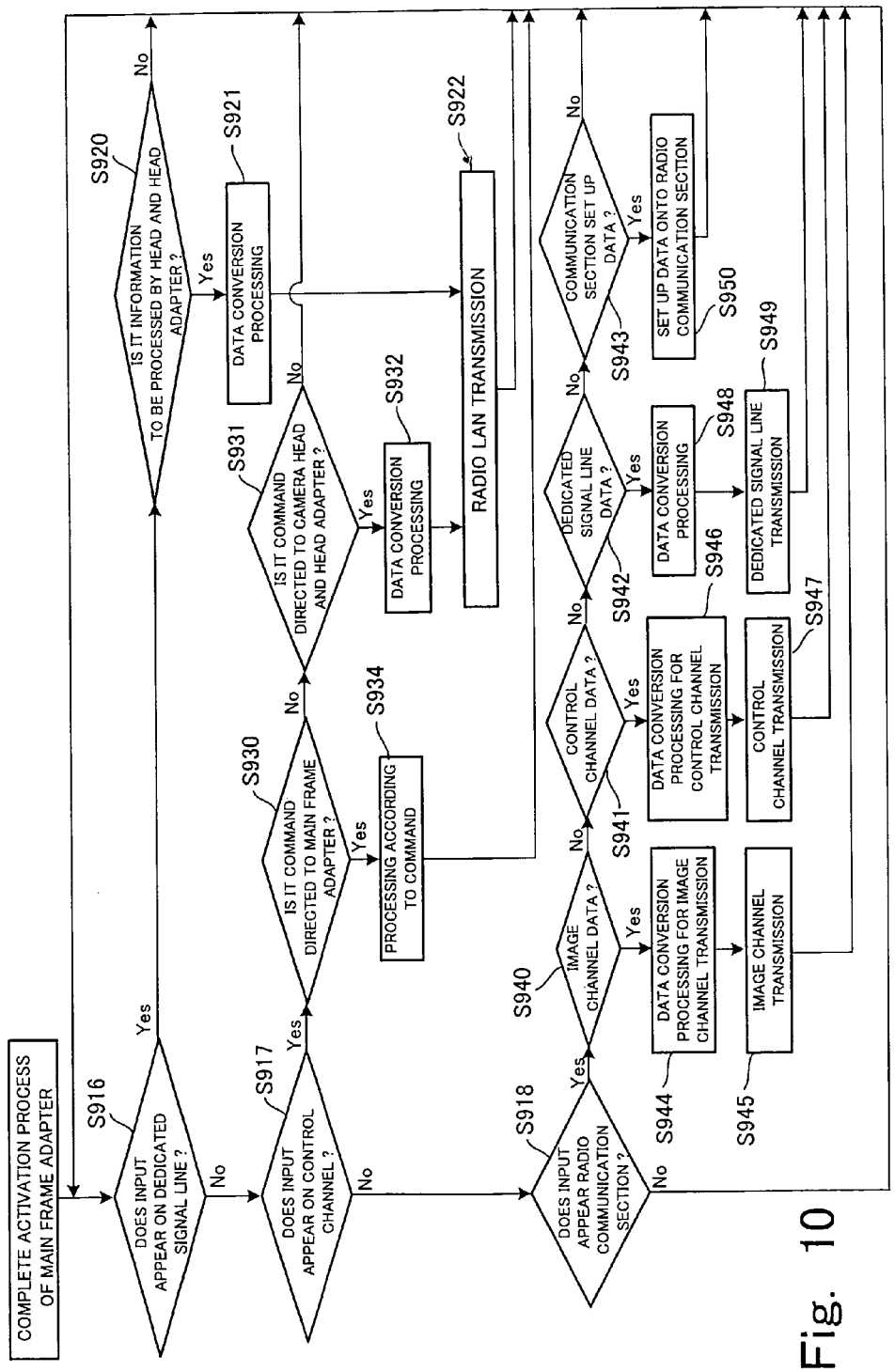

In the step S910, when it is decided that the link is completed, the process goes to a step S915 in which a main frame adapter initialization completion notification is issued to the camera main frame 1b, and goes to processing of FIG. 10.

FIG. 10 is a flowchart useful for understanding a procedure to be carried out by the main frame adapter CPU 20b, after the main frame adapter 2b is activated to establish a link between a main frame side radio communication section 21b and a head side radio communication section 25a.

When the processing of FIG. 9 is completed, in the step S916, the step S917, and the step S918, the main frame adapter CPU 20b performs a so-called awaiting processing. In the step S916, it awaits an input signal (e.g. the release signal) onto the dedicated signal line of the main frame adapter 2b. In the step S917, it awaits an input signal onto the low speed serial I/F 24b. In the step S918, it awaits an input signal onto the main frame side radio communication section 21b.

When the main frame adapter 2b receives an input signal such as the release signal via the dedicated line, in a step S920, the main frame adapter CPU 20b first determines whether the input signal is information to be processed in the camera head 1a and the head adapter 2a. For example, if the input signal is the release signal, there is a need to transmit the release signal to the camera head 1a and the head adapter 2a. Thus, the process goes to a step S921 in which the main frame side signal mediating section 22b converts the release signal into data suitable for the radio communication. In a step S922, the converted data is transmitted to the main frame side radio communication section 21b. In the step S920, if it is decided that the input signal is not the release signal, there is no need to transmit the signal to the camera head 1a and the head adapter 2a, and thus the process returns to the step S916 to repeat the processing of the step S916 to the step S918 for the awaiting state.

In the event that the low speed serial I/F 24b receives the input signal during the awaiting state, the process goes to "Yes" of a step S917 and then to a step S930 in which it is determined whether the input signal is concerned with a command directed to the main frame adapter 2b. In the step S930, when it is decided the input signal is concerned with the command directed to the main frame adapter 2b, the process goes to a step S934 in which processing according to the command is performed, and returns to the awaiting state. In the step S930, when it is decided that the input signal is not concerned with the main frame adapter 2b, the process goes to a step S931 in which when it is decided that the input signal is concerned with the camera head 1a and the head adapter 2a, the process goes to a step S932 in which the main frame side signal mediating section 22b converts the input signal to data suitable for the radio communication. In a step S922, the command subjected to the conversion processing is transmitted on a radio communication basis from the main frame side radio communication section 21b to the camera head 1a, and the process returns to the awaiting state.

When the main frame side radio communication section 21b receives an input signal during the awaiting state, in step S940 to step S943, it is determined: whether the input signal is an image signal; whether the input signal is a control signal; whether the input signal is a control signal to be transmitted via the dedicated signal line to the camera head in the event that the camera head is mounted on the camera main frame; and whether the input signal is set up data to be used for link processing to be performed between the main frame side radio communication section 21b and the head side radio communication section 25a.

In the step S940, when it is decided that the input signal is the image signal; the process goes to a step S944 in which the main frame side signal mediating section 22b performs the conversion processing so that the image signal can be transmitted via the high speed serial I/F 23b, which is the image channel, to the camera main frame 1b. Next, the process goes to a step S945 in which the image signal, which is subjected to the conversion processing via the high speed serial I/F 23b, is transmitted to the camera main frame 1b. In the step S941, when it is decided that the input signal is the control signal, the process goes to a step S946 in which the main frame side signal mediating section 22b performs the conversion processing, and then the process goes to a step S947 in which the control signal, which is subjected to the conversion processing via the low speed serial I/F (control channel), is transmitted to the camera main frame 1b. In the step S942, in the event that the radio signal transmitted from the camera head is received to the radio communication section, and the radio signal is a timing signal indicative of a flash light emission timing, for instance, the process goes to a step S948 in which the main frame side signal mediating section 22b performs the conversion processing, and then the process goes to a step S949 in which the timing signal is transmitted via the dedicated line to the flash section 120b. When it is decided that the input signal is data for a link establishment of the main frame side radio communication section 21b, the process goes to a step S950 in which there is performed set up necessary for the radio communication of the main frame side radio communication section 21b, and the process returns to the awaiting state.

Figure 11:
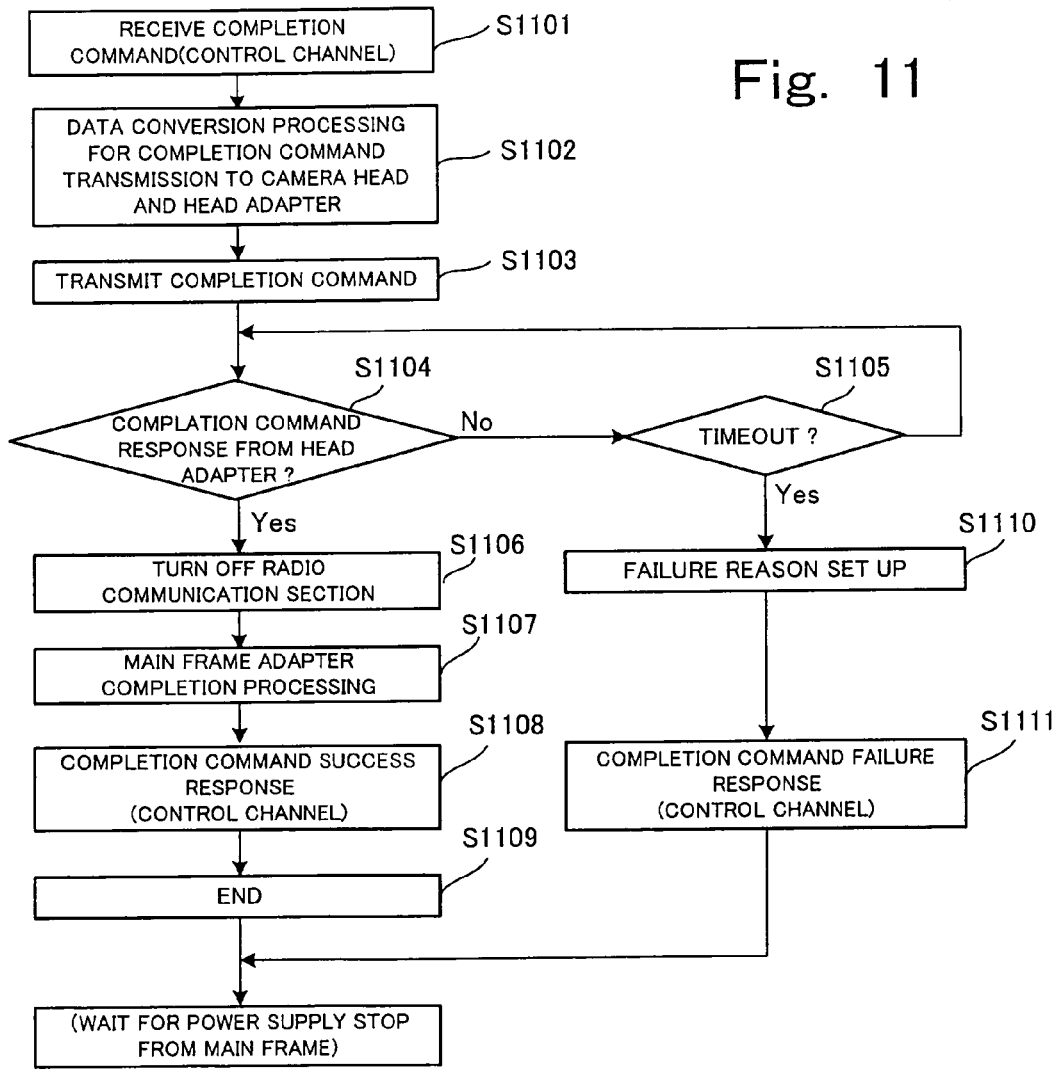
FIG. 11 is a flowchart useful for understanding a power source turn-off processing to be carried out by the main frame adapter CPU 20b.

FIG. 11 is a flowchart useful for understanding a power source turn-off processing to be carried out by the main frame adapter CPU 20b.

In a step S1101, when the main frame adapter receives the termination command according to the turn-off operation of the power switch of the camera main frame through the low speed serial I/F (control channel), the processing of the flow is initiated.

In a step S1102, the head side signal mediating section 24a performs the conversion processing for data for termination command transmission to be transmitted to the camera head and the head adapter. In a step S1103, the termination command is transmitted to the main frame side radio communication section 21b. In a step S1104, it is determined whether there is a response of the termination command from the head side adapter. In the step S1104, it is decided that there is the response, the process goes to a step S1106 in which the main frame side radio communication section 21b turns off to initiate the termination processing of the main frame adapter 2b. Next, the process goes to a step S1107 in which the termination processing of the main frame adapter 2b is completed. In a step 1108, a termination command success response is transmitted to the camera main frame. In a step S1109, it is a standby state, and then it is a power supply stop awaiting state.

In the step S1105, when it is decided that no time out occurs, the process returns to the step 1104 to repeat the processing. In the step S1105, when it is decided that the time out occurs, the process goes to a step S1110 in which a failure reason is set up on the low speed serial I/F, and the process goes to a step S1111 in which a termination command failure response is transmitted to the camera main frame 1b. This feature makes it possible that the main frame CPU 100b receives a command failure response from the main frame adapter to display on the display screen a message that "The termination processing is failure. Is the power source is forcibly turned off?". In any way, when those processing are terminated, it is a power supply stop awaiting state from the camera main frame.

Figure 12:
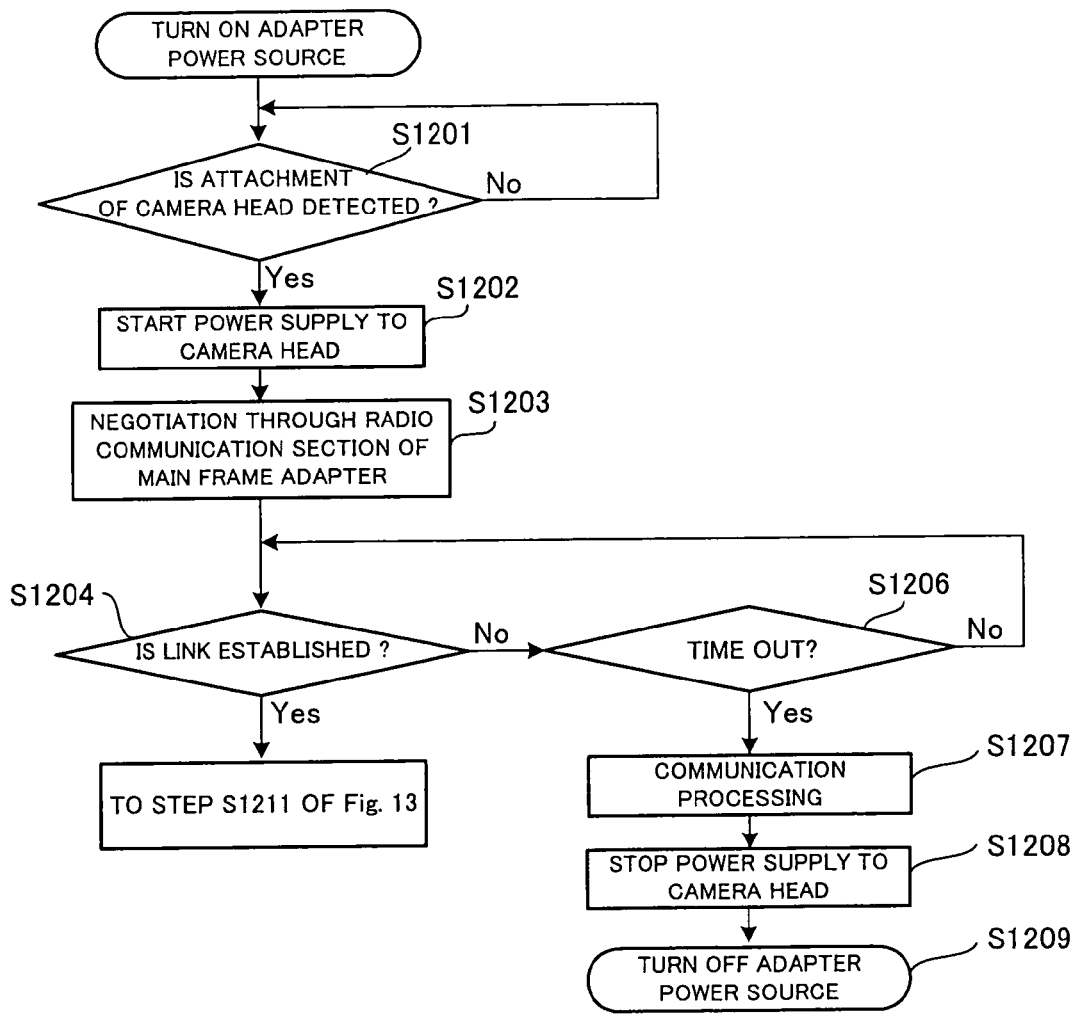

FIG. 12 is a flowchart useful for understanding a procedure of an initializing processing that is to be carried out by a head adapter CPU 20a of the head adapter 2a.

In a step S1201, it is determined whether the camera head 1a is mounted on the head adapter 2a to supply the ground signal (GND) from the camera head 1a to the head adapter 2a. In the step S1201, when it is decided that the ground signal (GND) is not supplied from the camera head 1a to the head adapter 2a, the process returns to the step S1201. In the step S1201, when it is decided that the ground signal (GND) is supplied, the process goes to a step S1202 in which the switch SW2 turns on to initiate the power supply to the camera head 1a. In a step S1203, the head side radio communication section 25a is activated to perform a negotiation with the main frame adapter 2b. In a step S1204, it is determined whether a negotiation with the main frame side radio communication section is completed. In the step S1204, when it is decided that the negotiation with the main frame side radio communication section is completed, the process goes to a step S1211 shown in FIG. 13.

In the step S1204, when it is decided that the link is not completed, the process goes to a step S1206. In the step S1206, when it is decided that the time out does not occur, the process returns to the step S1204 to repeat the processing. In the step S1206, when it is decided that the time out occurs, the process goes to a step S1207 in which head side radio communication section 25a turns off. In a step S1208, the switch changes over to stop the power supply to the camera head 1a.

In a step S1209, the adapter power source (the battery Bt2) turns off to terminate the processing of the flow.

Figure 13:
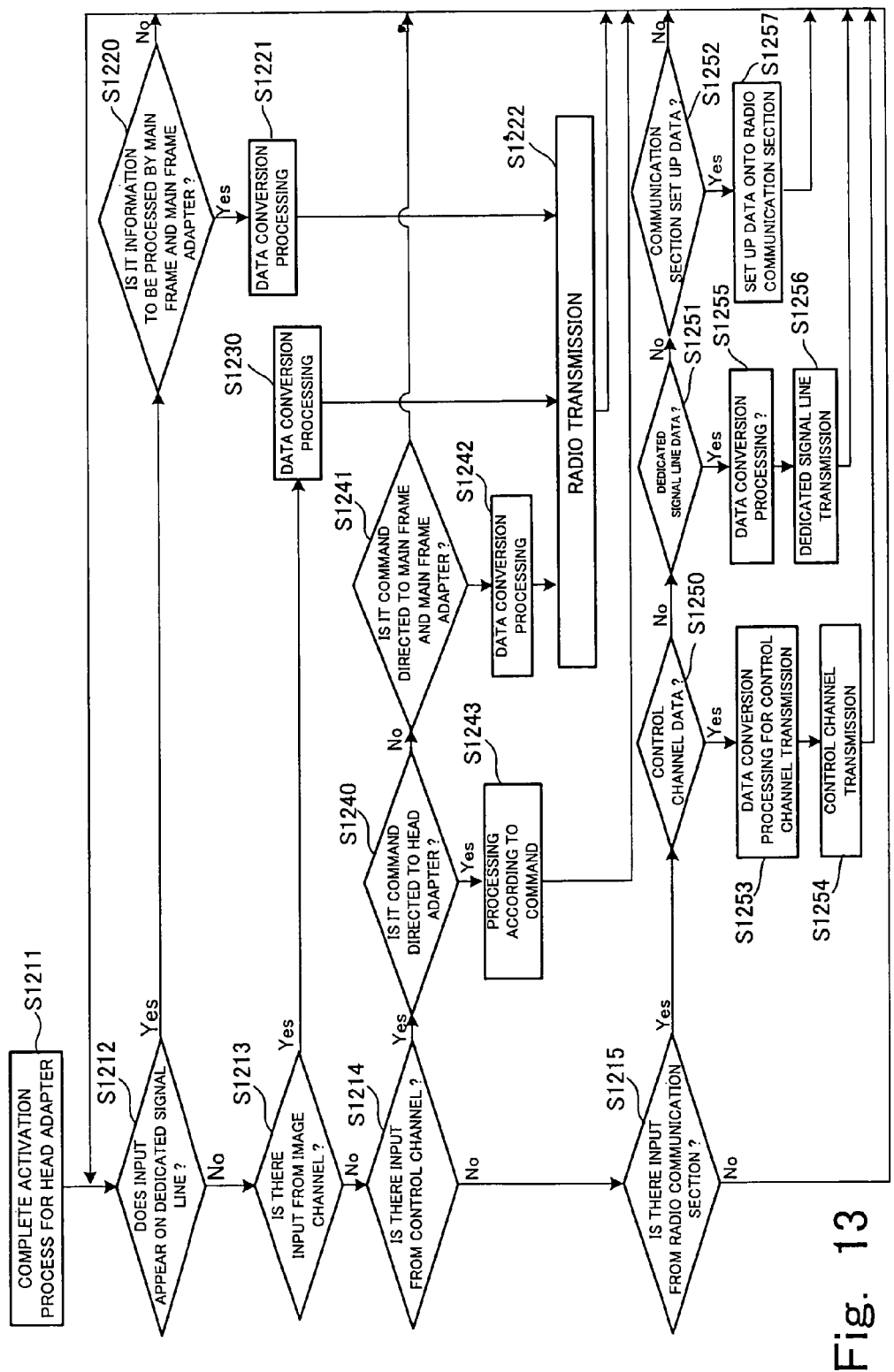
FIG. 13 is a flowchart useful for understanding a procedure of an initializing processing that is to be carried out by a head CPU, after activation of a head adapter is completed.

FIG. 13 is a flowchart useful for understanding a procedure of an initializing processing that is to be carried out by a head CPU, after activation of a head adapter is completed.

In step S1212 to step S1215, there is performed the awaiting processing. In the step S1212, it awaits the entry of a signal (e.g. the release signal, and a signal informing of the timing of the flash light emission signal) onto the dedicated signal line from the camera head 1a. In the step S1213, it awaits the entry of a signal onto the high speed serial I/F 23b. In the step S1214, it awaits the entry of a signal onto the low speed serial I/F 24b. In the step S1215, it awaits the entry of a signal onto the head side radio communication section 25a.

When there is made the entry of a signal from the camera head, in a step S1220, the head adapter CPU 20a determines whether the signal is concerned with information to be processed in the camera main frame 1b and the main frame adapter 2b. For example, in the event that the entered signal is GND signal, there is no need to transmit the signal to the camera main frame 1b and the main frame adapter 2b, and thus the process returns to the step S1212. In the step S1220, when it is determined that the head adapter CPU 20a decided that the signal is concerned with information to be processed in the camera main frame 1b and the main frame adapter 2b, the process goes to a step S1221 in which the data conversion processing is performed. In a step S1222, the data subjected to the conversion processing is transmitted on a radio communication to return the awaiting state.

When the high speed serial I/F 23b (the image channel) receives the entry during the awaiting state, in the step S1213, the process goes to a step S1230 in which the data conversion process is applied. Next, the process goes to the step S1222 in which the head side radio communication section 25a transmits on a radio communication the image data subjected to the conversion processing.

When the low speed serial I/F 24b (the control channel) receives the entry during the awaiting state, in the step S1214, the process goes to a step S1240 in which it is determined whether the input signal is concerned with the command directed to the head adapter. In the step S1214, it is decided that the input signal is concerned with the command directed to the head adapter, the process goes to a step S1243 in which processing according to the command is performed, and returns to the awaiting state. In the step S1241, when it is decided that the input signal is concerned with the command directed to the camera main frame and the main frame adapter, but not the command directed to the head adapter, the process goes to the step S1242 in which the head side signal mediating section 24a performs the conversion processing. Next, the process goes to the step S1222 in which the head side radio communication section 25a transmits the command on a radio communication to the camera main frame 1b, and returns to the awaiting state.

When the head side radio communication section 25a receives the entry during the awaiting state, in step S1250 to step S1252, it is determined: whether a signal, which is inputted to the head side radio communication section 25a, is a control signal to be transmitted to the camera head 1a through the low speed serial I/F 29a or the control channel; whether the signal is a signal to be transmitted via the dedicated signal line to the camera head 1a; and whether the signal is data related to the link set up of the head side radio communication section 25a, respectively.

In the step S1250, when it is decided that the signal is the control signal, the process goes to a step S1253 in which the head side signal mediating section 24a performs the data conversion processing. In a step S1254, the low speed serial I/F 29a (the control channel) is used to transmit the control signal to the camera head 1a. In the step S1251, when it is decided that the signal is, for example, the release signal, there is a need to transmit the release signal using the dedicated signal line. Thus, in a step S1255, the release signal is subjected to the data conversion, and then, in step S1256, the release signal is transmitted via the dedicated signal line to the camera head. In the step S1252, when it is decided that the signal is information related to the link set up of the head side radio communication section 25a, in a step S1257, the link set up of the head side radio communication section 25a is performed, and then the process returns to the awaiting state.

Figure 14:
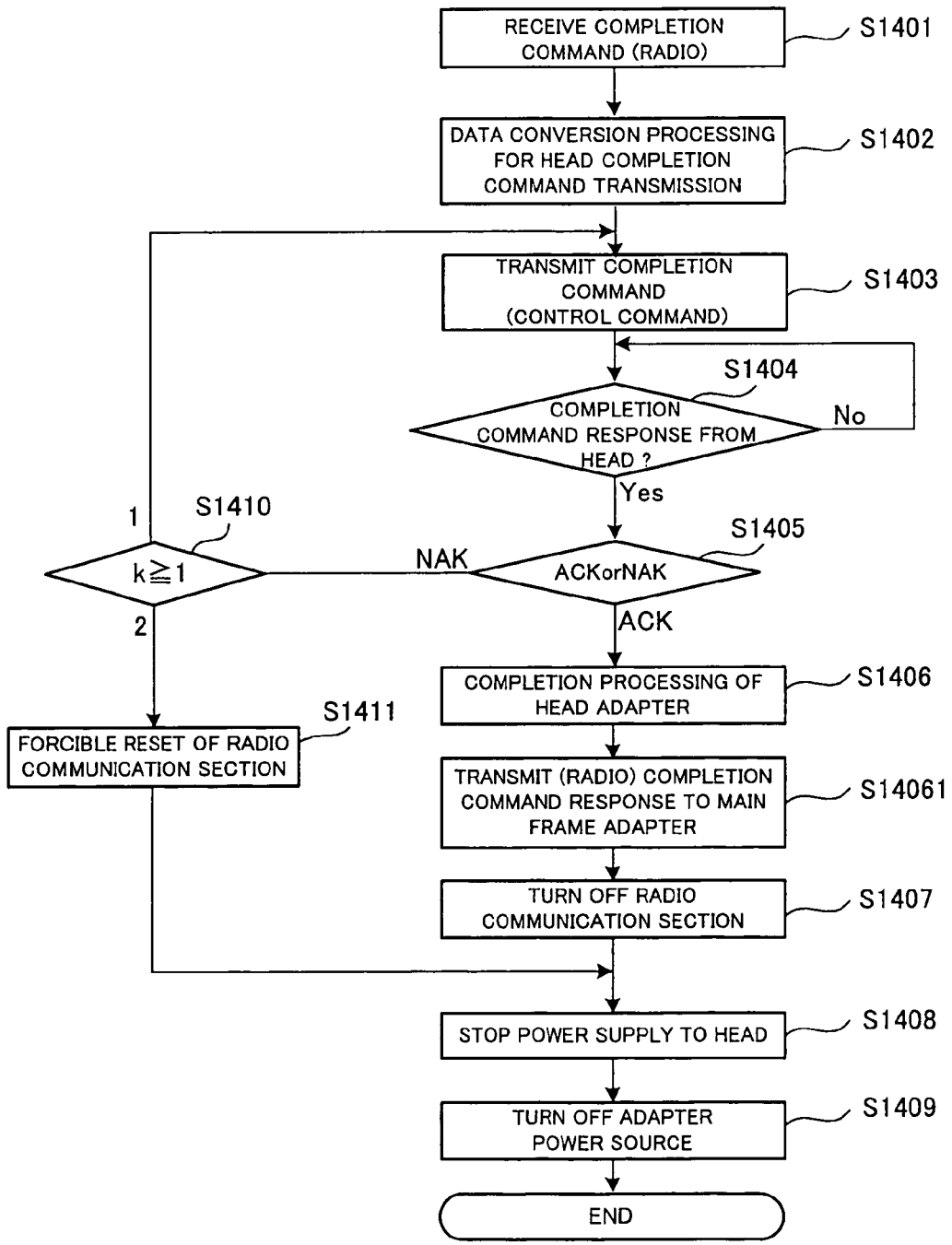

FIG. 14 is a flowchart useful for understanding a power source turn-off processing to be carried out by the head adapter CPU 19a.

In step S1401, when the head adapter 2a receives a termination command by the head side radio communication section 25a in accordance with the turn-off operation of the power source switch of the camera main frame, the processing of the flow is initiated.

In step S1402, the head side signal mediating section 24a performs the conversion processing for termination command transmitting data, which is to be transmitted to the camera head 1a. In step S1403, the termination command is transmitted via the low speed serial I/F 29a to the camera head. In step S1404, it is determined whether there is a respond signal representative of the termination command from the camera head 1a. In step S1404, when it is decided that there is the respond signal, the process goes to a step S1405 in which the content of the respond signal is determined. In the step S1405, when it is detected that the respond signal of ACK (acknowledge), the process goes to a step S1406 in which the termination processing of the head adapter 2a is started. Next, the process goes to a step S14061 in which the head side radio communication section 25a transmits a termination command response to the main frame adapter. In a step S1407, the head side radio communication section 25a turns off. In the step S1405, when the respond signal of NAK is received, the termination command is again transmitted via the low speed serial I/F 29a to the camera head 1a.

In the step S1405, when it is again decided that the respond signal of NAK is received, the process goes to a step S1410 in which the number of times for processing is determined. When it is decided that the number of times is not less than 2, the process goes to a step S1411 in which head side radio communication section 25a is forcibly reset. Next, the process goes to a step S1408 in which a power supply to the camera head 1a is stopped. In step S1409, the switch of the power source control section turns off, and the processing of the flow is terminated.

According to the above description, the camera head 1a and the camera main frame 1b are individually explained in their processing. Hereinafter, in order to easier understand their processing, there will be explained the initialization processing on a unity basis.

Figure 15:
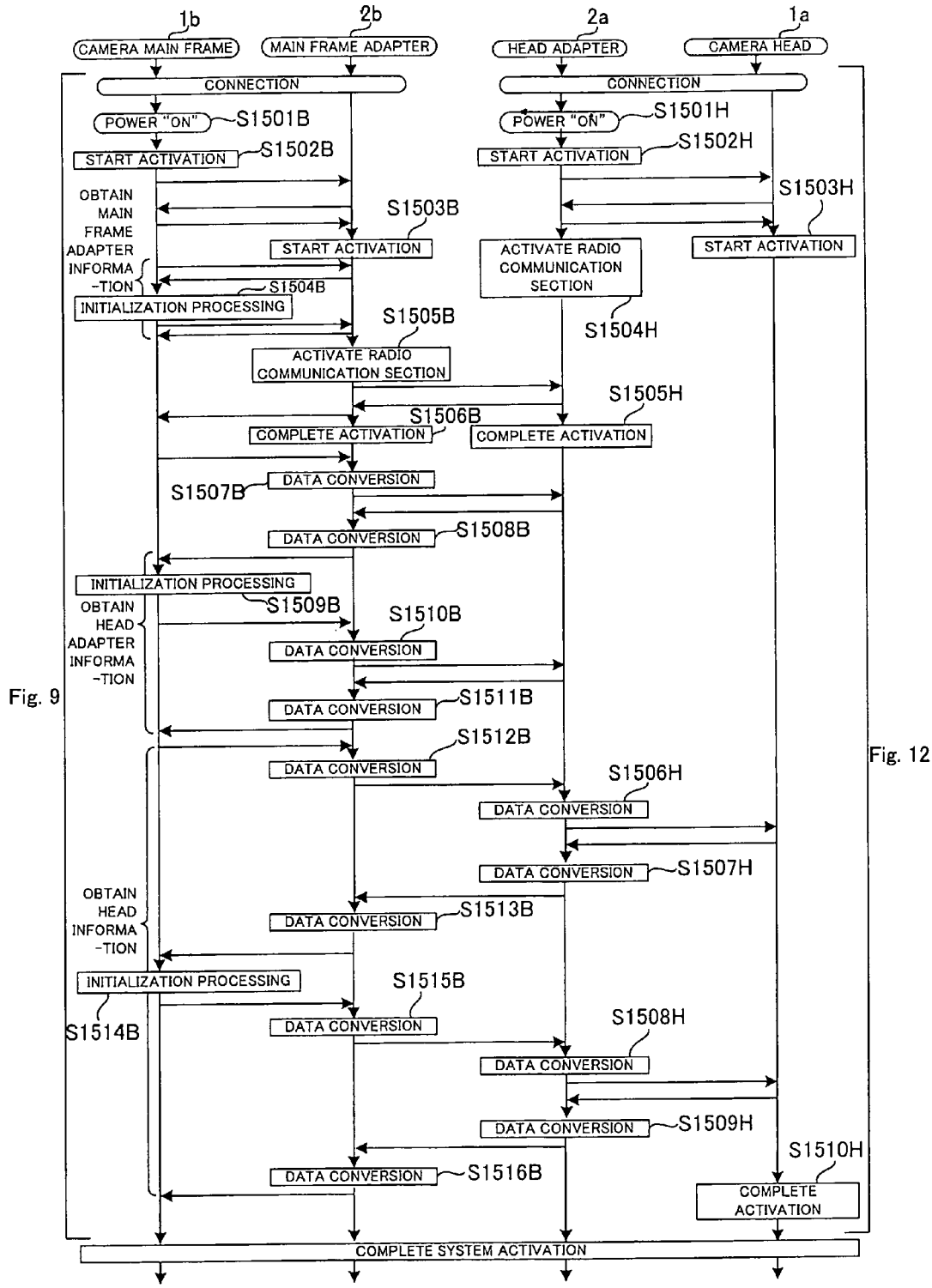

FIG. 15 is a flowchart useful for understanding a communication of initialization processing information among the camera main frame 1b, the main frame adapter 2b, the head adapter 2a, and the camera head 1a. The left of FIG. 15 is a flowchart useful for understanding the initialization processing of the camera main frame as shown in FIG. 9, and the right of the FIG. 15 is a flowchart useful for understanding the initialization processing of the camera head as shown in FIG. 12.

FIG. 15 shows a procedure where first, initialization processing of the main frame adapter 2b is performed, next, initialization processing of the head adapter 2a is performed, and finally, initialization processing of the camera head 1a is performed.

The initialization processing of the camera main frame 1b, on which the main frame adapter 2b is mounted, and the initialization processing of the camera head 1a, on which the head adapter 2a is mounted, are performed on a parallel basis. Accordingly, in explanation of the initialization processing of the camera head 1a, on which the head adapter 2a is mounted, "B" (it is a capital letter of "BASE") is added to the tail of steps, and in explanation of the initialization processing of the camera main frame 1b, on which the main frame adapter 2b is mounted, "H" (it is a capital letter of "HEAD") is added to the tail of steps.

First, when the main frame adapter 2b is mounted on the camera main frame 1b and the head adapter 2a is mounted on the camera head 1a, there are initiated the initialization processing of the camera main frame 1b having the battery, and the initialization processing of the head adapter 2a having the battery in accordance with the procedure shown in FIG. 15.

First, in step S1501B, the power source of the camera main frame 1b turns on. In step S1502B, the camera main frame 1b is activated. As explained with reference to FIG. 9 too, in the step S1502B, when the camera main frame 1b is activated, the ground signal (GND) is fed to the detection terminal (Det) of the main frame CPU 100b, if the main frame adapter 2b is mounted. Thus, in step S1503B, the GND signal is detected and the switch turns on, so that the electric power is supplied from the battery Bt to the main frame adapter 2b, and the initialization processing of the main frame adapter 2b is initiated.

On the other hand, in step S1501H, the power source of the head adapter 2a turns on. In step S1502H, the head adapter 2a is activated. As explained with reference to FIG. 12 too, when the head adapter 2a is mounted on the camera head 1a, the attachment of the camera head 1a is detected by the supply of the ground signal (GND) to the head adapter CPU and the switch turns on, so that the electric power is supplied from the head adapter 2a to the camera head 1a.

When the activation of the camera head 1a and the head adapter 2a and the activation of the camera main frame 1b and the main frame adapter 2b are completed, the initialization processing of the camera main frame 1b including the main frame adapter 2b starts.

According to the present embodiment, in order that the camera main frame 1b performs the initialization processing, the camera main frame 1b supplies an initialization requirement command to the main frame adapter 2b which is mounted on the camera main frame 1b, and receives a command representative of information as to the main frame adapter 2b, which is transmitted from the main frame adapter 2b to the camera main frame 1b.

In step S1504B, the camera main frame 1b starts the initialization processing of the camera main frame 1b including the main frame adapter 2b. Next, the camera main frame 1b issues an initialization completion command to the main frame adapter 2b, and knows it, when a command representative of a response from the main frame adapter 2b is returned, that the initialization completion command is received by the main frame adapter 2b. Upon receipt of a notice of the completion of the initialization of the camera main frame 1b, in step S1505B, the main frame adapter 2b activates the main frame side radio communication section 21b to initiate a link establishment necessary for communications with the head side radio communication section 25a of the head adapter 2a. The main frame adapter 2b issues a link establishment requirement to the head adapter 2a. When the main frame adapter 2b receives a response of a link establishment from the head adapter 2a, the main frame adapter 2b issues a notice of a link establishment to the camera main frame 1b, and the process goes to step S1506B in which the activation is completed. On the other hand, also in the head adapter 2a, the process goes to step S1505H in which the activation is completed.

Up to here, there is performed the initialization processing so that the camera main frame 1b obtains initialization information of the camera head 1a and initialization information of the head adapter 2a. Here, the camera main frame 1b starts obtaining of initialization information of the camera head 1a and initialization information of the head adapter 2a.

First, the main frame adapter 2b receives the initialization requirement command directed to the head adapter 2a, which is transmitted from the camera main frame 1b via the low speed serial I/F 110b. In step S1507B, the initialization requirement command directed to the head adapter 2a is subjected to the data conversion, and the main frame side radio communication section 21b is used to issue a requirement of transmission of the initialization information to the head adapter 2a (cf. FIG. 7). When the main frame side radio communication section 21b receives the initialization information of the head adapter 2a, which is transmitted on a radio communication basis from the head side radio communication section 25a of the head adapter 2a, the main frame adapter 2b receives the initialization information of the head adapter 2a using the main frame side radio communication section 21b and transmits the received initialization information of the head adapter 2a to the camera main frame 1b using the low speed serial I/F 24b (cf. FIG. 6). The camera main frame 1b receives the initialization information of the head adapter 2a and executes the initialization processing (step S1509B).

Next, in order to transmit an initialization completion command to the head adapter 2a, the initialization completion command is transmitted to the main frame adapter 2b. Upon receipt of the initialization completion command, the main frame adapter 2b performs the data conversion into a signal suitable for the radio transmission and transmits on a radio transmission basis the initialization completion command to the head adapter 2a (step S1510B). When the main frame adapter 2b receives a response command from the head adapter 2a, the main frame adapter 2b performs the data conversion into data capable of being processed in the camera main frame 1b and transmits the converted data to the camera main frame 1b (step S1511B). Thus, the camera main frame 1b completes the initialization including the main frame adapter 2b and the head adapter 2a.

Next, in order that the camera main frame 1b issues an initialization requirement command directed to the camera head 1a, the camera main frame 1b first transmits the initialization requirement command to the main frame adapter 2b using the low speed serial I/F 110b (cf. FIG. 7). In step S1512B, the main frame adapter 2b performs the data conversion and transmits on a radio transmission basis the initialization requirement command to the head adapter 2a using the main frame side radio communication section 21b. The head adapter 2a controls the head side radio communication section 25a (cf. FIG. 6) to receive the initialization requirement command on a radio transmission basis. In step S1506H, the received initialization requirement command is converted into data capable of being processed in the camera head 1a and then transmitted to the camera head 1a using the low speed serial I/F 29a (cf. FIG. 6). The camera head 1a sends a reply of initialization information of the camera head 1a via the low speed serial I/F 29a to the head adapter 2a. Upon receipt of the initialization information, in step S1507H, the head adapter 2a converts data representative of the received initialization information into data capable of being received by the head side radio communication section 25a and transmits the converted data to the head side radio communication section 25a. When the initialization information of the camera head 1a is transmitted on a radio transmission basis from the head side radio communication section 25a of the head adapter 2a to the main frame side radio communication section 21b of the main frame adapter 2b, the main frame adapter 2b receives the converted data using the main frame side radio communication section 21b. In step S1513B, the data is subjected to the data conversion, and then transmitted to the camera main frame 1b using the low speed serial I/F 24b. In step S1514B, the camera main frame 1b obtains information of the camera head 1a and executes the initialization processing. Thereafter, when the initialization processing is completed, a suitable data conversion processing is performed in processing steps of step S1515B and step S1508H, and an initialization completion command is transmitted to the camera head 1a. When the camera main frame 1b receives a response command, which is transmitted from the camera head 1a via the processing steps of step S1509H and step S1516B, the system activation of the camera system is completed.

Figure 16:
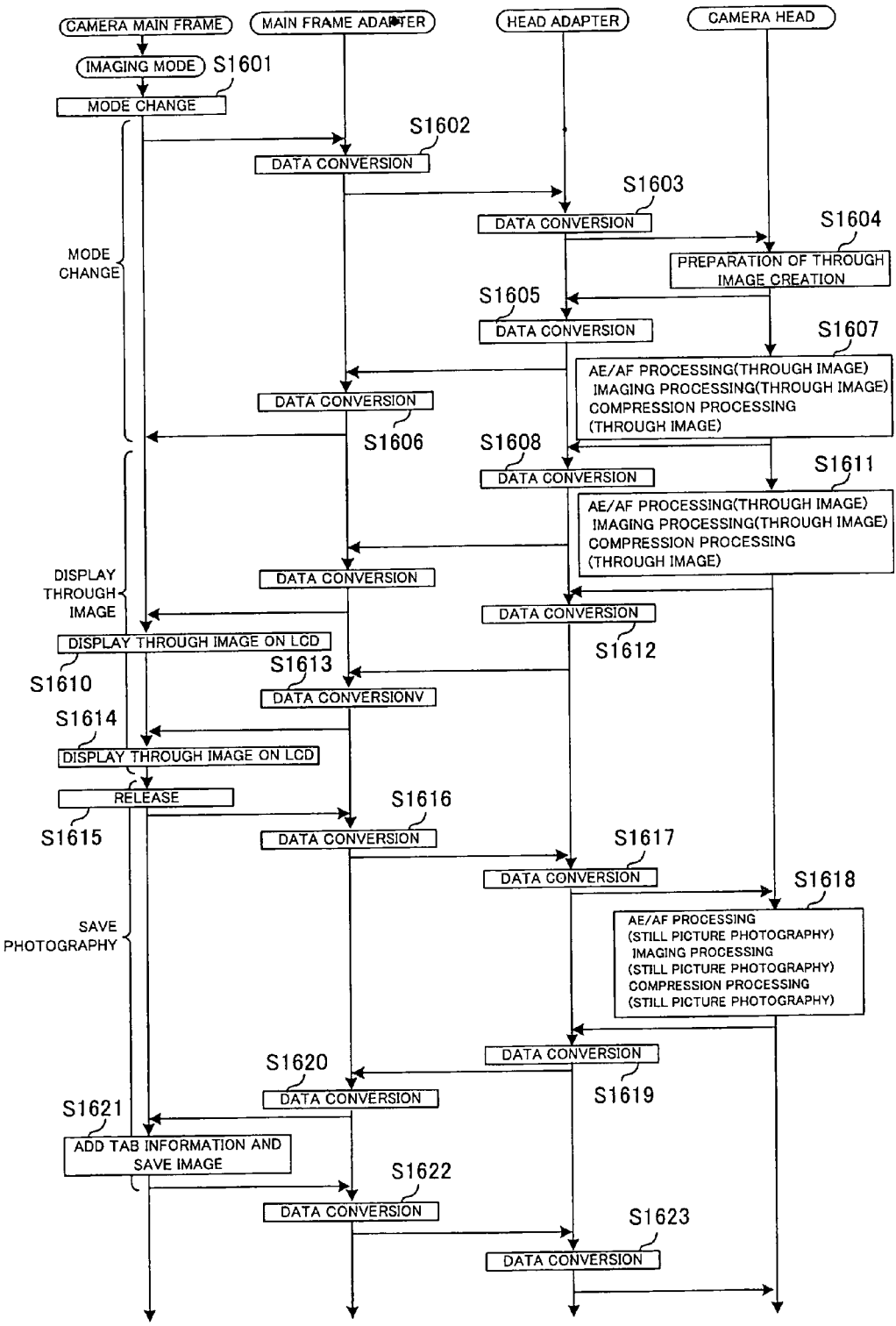
FIG. 16 is a flowchart useful for understanding a procedure of processing that is to be carried out when an image taking mode is concerned, after activation of the system of FIG. 15 is completed.

FIG. 16 is a flowchart useful for understanding a procedure of processing that is to be carried out when an image taking mode is concerned, after activation of the system of FIG. 15 is completed.

Here, there will be explained processing where the compressed through image signal is required of the camera head 1a assuming that there is a possibility that the camera main frame 1b brings about the overflow of signals when it is intended that the camera main frame 1b directly receives an image signal consisting of RAW data generated on the CCD of the camera head 1a.

Step S1601 to step S1606 of FIG. 16 show procedure where negotiation establishes by the negotiation between the camera main frame 1b and the camera head 1a.

In the step S1601 to the step S1604, the camera main frame 1b issues to the camera head 1a a transmission request for transmission of the compressed through image. In the step S1604 to the step S1606, the camera head 1a transmits to the camera main frame 1b a response command indicative of "acceptance".

Thus, when the camera head 1a informs the camera main frame 1b of a response to the transmission requirement of the compressed through image, in step S1607 to step S1614, the compressed through image signals are sequentially transmitted at regular intervals.

When the release button 13b is depressed, while the through images, which are based on the compressed through image signals transmitted at regular intervals, are displayed on the LCD panel on a switching base (the step S1610, the step S1614 . . . ), the processing following step S1615 is initiated.

In the step S1615, when the release button 13b is depressed, a release signal is transmitted to the main frame adapter 2b. In step S1616, the release signal is converted into a signal suitable for a radio transmission, and the head adapter 2a transmits the converted signal. When the head side radio communication section 25a receives the converted signal, in step S1617, the converted signal is converted into data capable of being processed by the camera head 1a, and the release signal having the same signal format as the release signal of the camera main frame 1b is transmitted to the camera head 1a.

Next, the high speed serial I/F 15a transmits to the head adapter 2a the still picture signal generated on the CCD 12a of the camera head 1a. In step S1619, the JPEG compression/expansion section 231a of the head adapter 2a performs the completion of the still picture signal and transmits the compressed still picture signal via the head side radio communication section 25a to the main frame adapter 2b.

When the main frame adapter 2b receives the still picture signal on a radio transmission basis, in step S1620, the data conversion is performed, and the compressed still picture signal is transmitted to the camera main frame 1b. Then, the compressed still picture signal is recorded on a recording media on which compressed information is added in form of tag information.

Thereafter, in the step S1607 to the step S1614, a series of processing is performed to carry out processing for the through image display.

Thus, the camera main frame 1b performs negotiations with the main frame adapter 2b, the head adapter 2a, and the camera head 1a to obtain their associated initialization processing information, so that the camera main frame 1b execute the initialization processing according to characteristics of the main frame adapter 2b, the head adapter 2a, and the camera head 1a. Thus, in the camera system in the state of the separation, an adaptive initialization processing is performed in accordance with the categorization of the camera head 1a and the camera main frame 1b, and then the photography processing is started.

Figure 17:
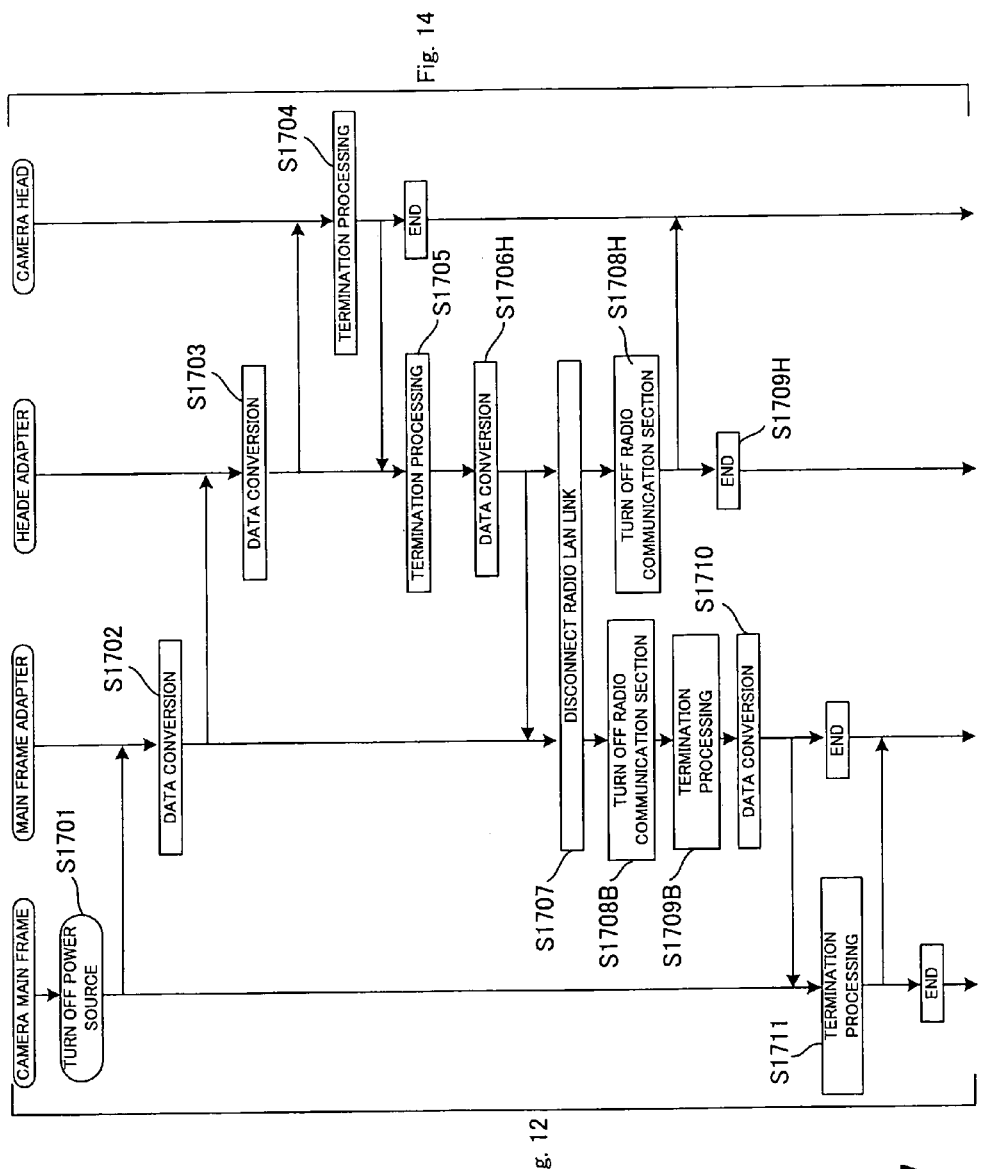
FIG. 17 is a flowchart useful for understanding completion processing.

FIG. 17 is a flowchart useful for understanding completion processing.

As shown in FIG. 17, in step S1701, the power switch of the camera main frame 1b turns off. Then, in step S1702 to step S1704, termination requests of the system are sequentially transmitted to the main frame adapter 2b, the head adapter 2a, and the camera head 1a. When the camera head 1a receives the termination request, in step S1705 to step S1711, a response is transmitted to the camera main frame 1b to execute the termination processing of the system.

First, in the step S1704, upon receipt of the termination request from the camera main frame 1b, the camera head 1a performs the termination processing to issue a termination response to the head adapter 2a. Upon receipt of the termination response, the head adapter 2a initiates the termination processing (the step S1705). In step S1706, in order to inform the main frame adapter 2b of the execution of the termination processing, a termination processing command of the data conversion is transmitted on a radio communication basis to the main frame adapter 2b.

Upon receipt of the termination processing command, in step S1707B, the main frame adapter 2b starts radio link disconnection processing, also in step S1708H (the head adapter 2a). Next, in step S1708B, the main frame side radio communication section 21b performs the turn-off processing, and the process goes to step S1709B in which the termination processing of the camera head 1a and the head adapter 2a is terminated. In step S1710B, the main frame adapter 2b transmits to the camera main frame 1b the termination processing command, which is subjected to the data conversion. Upon receipt of the termination processing command, the camera main frame 1b performs the termination processing to stop the power supply to the main frame adapter 2b (step S1711).

Thus, the termination processing of the main frame adapter 2b and the camera main frame 1b is completed.

This feature makes it possible to perform the termination processing in the named order of the camera head 1a, the head adapter 2a, the main frame adapter 2b, and the camera main frame 1b. Therefore, according to the present embodiment, it is possible to avoid such a situation that when it is intended to restart the camera system, any section of the system is not yet reset, and inconvenience occurs.

In FIG. 15, the initialization processing of the main frame adapter 2b is performed at the same time as the start of the power supply. On the other hand, it happens that it is better to perform the initialization of the camera main frame 1b including the camera head 1a and the head adapter 2a.

Figure 18:
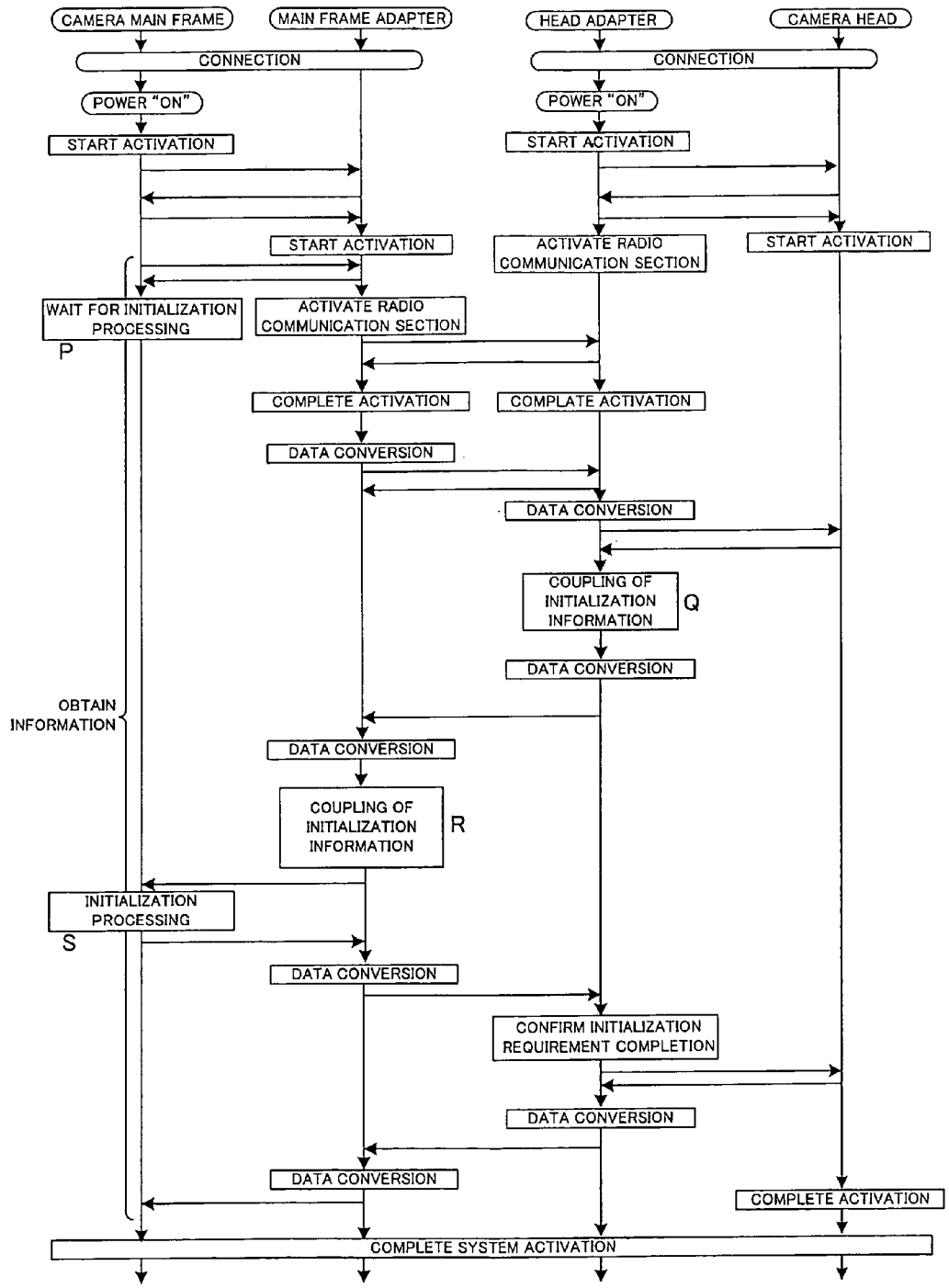
FIG. 18 is a flowchart useful for understanding a procedure in the event that initialization information of the camera head 1a, initialization information of the head adapter 2a, and initialization information of the main frame adapter 2b, are combined with one another, and then initialization processing is carried out.

FIG. 18 is a flowchart useful for understanding a procedure in the event that initialization information of the camera head 1a, initialization information of the head adapter 2a, and initialization information of the main frame adapter 2b, are combined with one another, and then initialization processing is carried out.

According to the procedure as shown in FIG. 18, it is improved in following point. There is performed waiting processing (an initialization processing waiting portion indicated with a reference symbol mark P), and performed initialization processing for the camera system in its entirety at the portion indicated with a reference symbol mark S to meet initialization information from the camera head 1a, but not performed the initialization processing of the main frame adapter 2b as shown in FIG. 15.

FIG. 19 is a flowchart useful for understanding combined information in which pieces of initialization information are combined.

A part (a) of FIG. 19 shows combined configuration information of the portion indicated with a reference symbol mark Q. A part (b) of FIG. 19 shows combined configuration information of the portion indicated with a reference symbol mark R.

As shown in FIG. 19, since pieces of initialization information are combined, the camera main frame 1b can execute on a batch basis the initialization processing at the portion indicated with reference symbol mark S.

Figure 20:
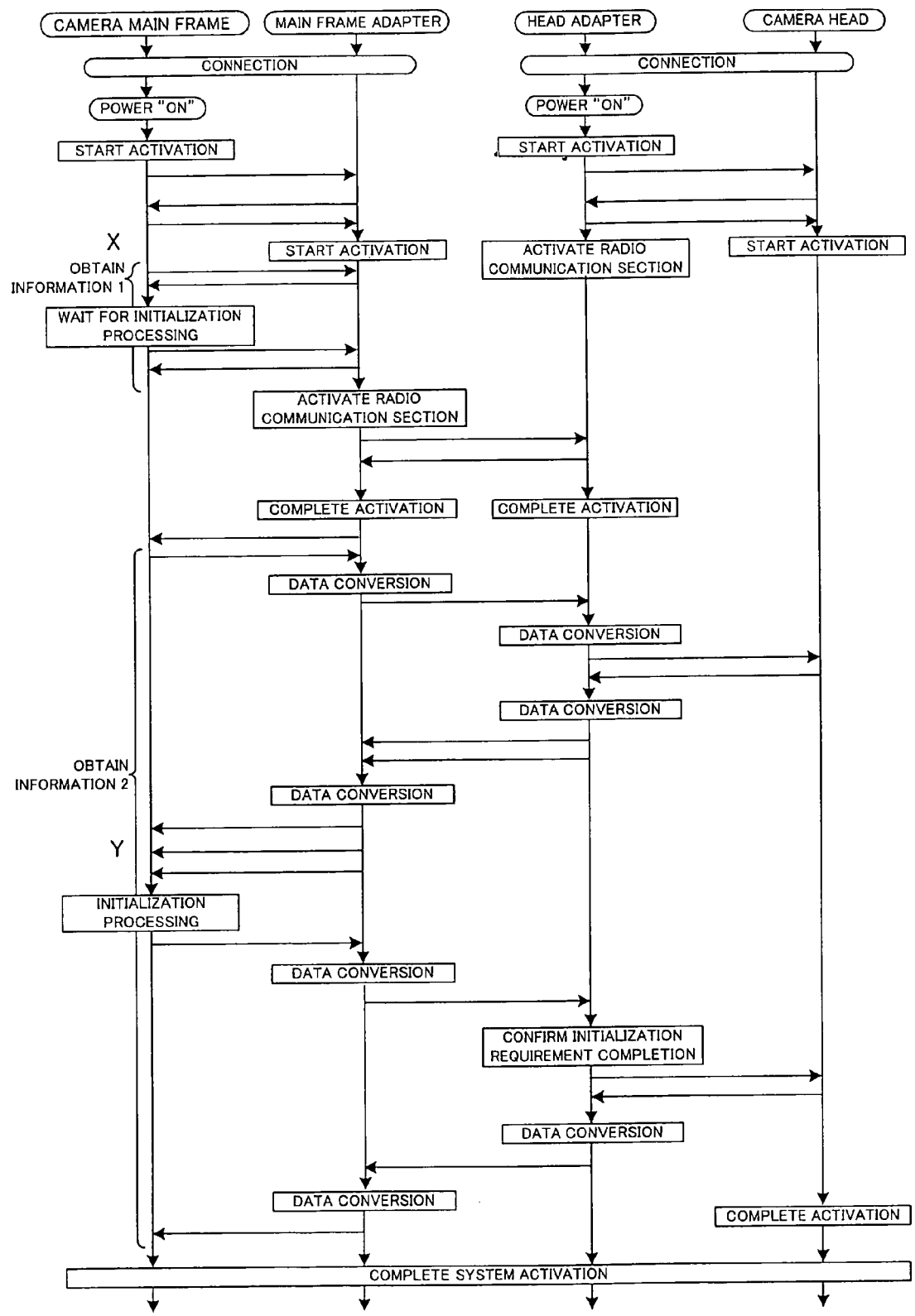
FIG. 20 is a flowchart that is a modification of that of FIG. 18.

FIG. 20 is a flowchart that is a modification of that of FIG. 18.

According to FIG. 18, the initialization information of the camera head 1a, initialization information of the head adapter 2a, and initialization information of the main frame adapter 2b, are combined with one another. However, it is acceptable that in the process indicated with reference symbol mark X, information of the main frame adapter 2b is obtained to perform the initialization processing, and thereafter in the process indicated with reference symbol mark Y, the initialization information of the camera head 1a, initialization information of the head adapter 2a, and initialization information of the main frame adapter 2b are obtained so that the initialization processing is performed over again, without the synthesis of the pieces of initialization information.

Figure 21:
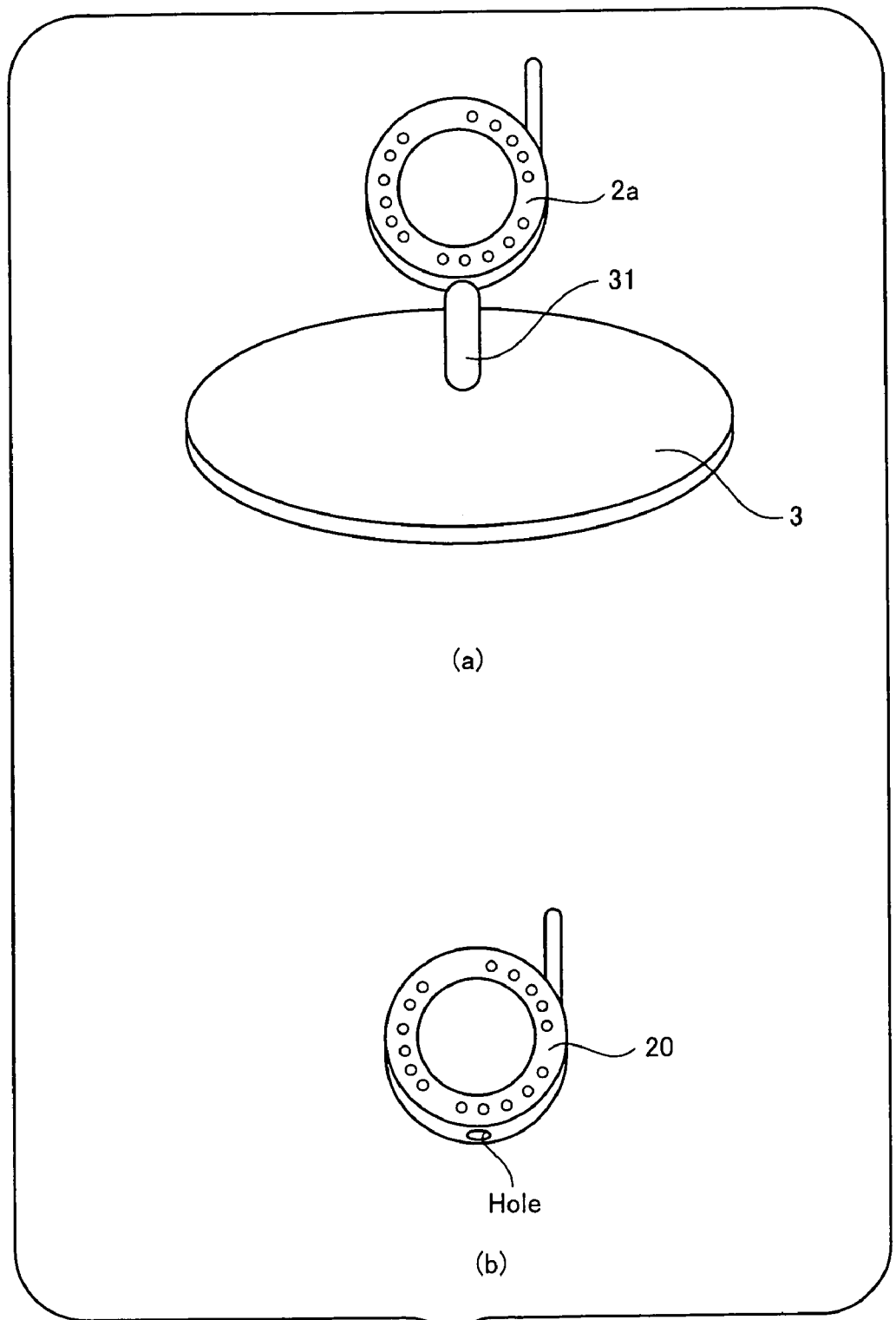

FIG. 21 is a view showing an example of a pedestal 3 for supporting the head adapter 2a.

As shown in part (a) of FIG. 21, the head adapter 2a has the pedestal 3 for supporting the head adapter 2a and the camera head 1a onto which the head adapter 2a is mounted.

Part (b) of FIG. 21 shows a structure for supporting the head adapter 2a and the camera head 1a in such a manner that there is provided a hole "Hole" on a portion of the periphery of the head adapter 2a, and a supporting rod 31 on the pedestal 3 is engaged with the hole "Hole".

In this manner, the pedestal 3 supports the head adapter 2a and the camera head 1a onto which the head adapter 2a is mounted. This feature makes it possible for an operator to enjoy photography by a remote control from the camera main frame 1b side through setting the camera head 1a to a predetermined position beforehand.

Thus, it is very convenient that an operator can enjoy photography by a remote control from the camera main frame 1b side through setting the camera angle of the camera head 1a to a predetermined position beforehand. However, some person would feel that something is missing with only the fixed image angle. Hence it is considered that a pedestal is provided with rotary mechanisms.

Figure 22:
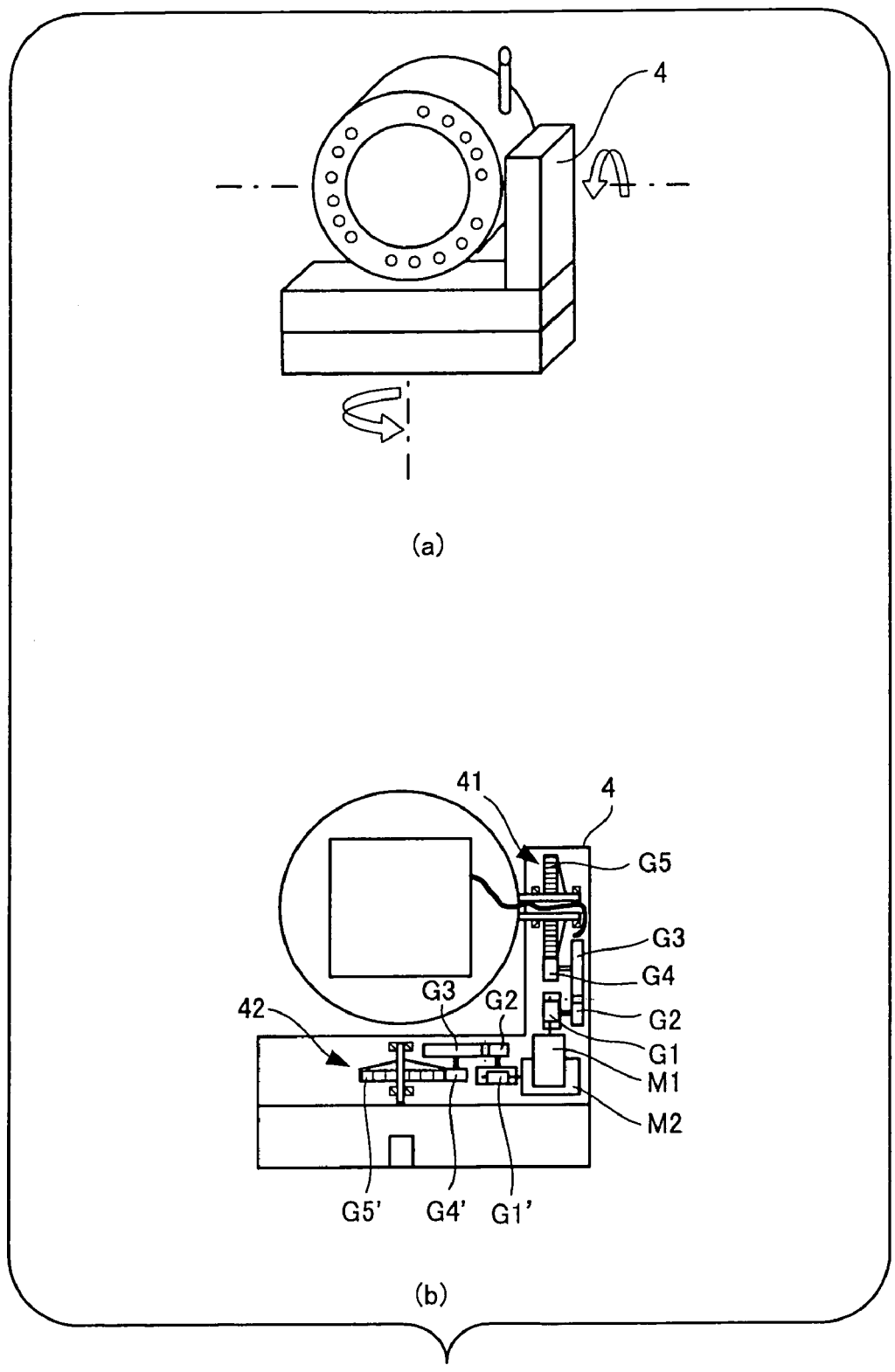
FIG. 22 is a conceptual view showing a structure wherein rotary mechanisms for horizontal direction and vertical direction, as adjusting mechanism for adjusting a direction of a camera head, are installed in a pedestal 4.

FIG. 22 is a conceptual view showing a structure wherein rotary mechanisms 41 and 42 for horizontal direction and vertical direction, as adjusting mechanism for adjusting a direction of a camera head, are installed in a pedestal 4.

FIG. 22 shows a structure of the pedestal 4 in which the head adapter 2a is capable of rotating in the horizontal direction of FIG. 22, and also rotating in the vertical direction.

The head adapter 2a is provided with the hole "Hole" as shown in FIG. 21. Thus, there is provided such an arrangement that a supporting rod 41 to be engaged with the hole "Hole" is fixed and the head adapter 2a is capable of rotating on the supporting rod 41. This arrangement makes it possible that the head adapter 2a rotates in the horizontal direction. Also in the vertical direction, there is provided the similar rotary mechanisms. Thus, it is possible that the head adapter 2a rotates in the vertical direction. In this manner, the rotary instruction from the camera main frame 1b is issued through the head side radio communication section 25a of the head adapter 2a. This feature makes it possible to implement a camera system capable of changing a direction of a camera head through a remote control.

According to the example shown in FIG. 22, there is provided such an arrangement that the pedestal 4 is provided with a motor M1 for a vertical direction rotation and a motor M2 for a horizontal direction rotation, and the motor M1 and the motor M2 are rotated in accordance with the rotary instruction from the camera main frame 1b, so that gears G1 to G4 and gears G1' to G4', which are coupled with the motor M1 and the motor M2, respectively, are rotated.

More in detail, the motor M1 and the motor M2 are directly coupled to worm gears (G1 and G1') on their head sections, respectively. Gears (G2 and G2') are coupled via worm wheels with worm gears (G1 and G1'), respectively. Gears (G3 and G3') are coupled with the gears (G2 and G2'), respectively. Gears (G4 and G4') are coupled with rotary shafts of the gears (G3 and G3'), respectively. Gears (G5 and G5') having slip functions are coupled with gears (G4 and G4'), respectively. Rotary shafts of the gears (G5 and G5') having slip functions are formed with hollows into which wiring materials are inserted. Accordingly, even if the head adapter 2a rotates, it is possible to exactly transmit the driving signal from the head adapter 2a to the motor section in the pedestal.

Figure 23:
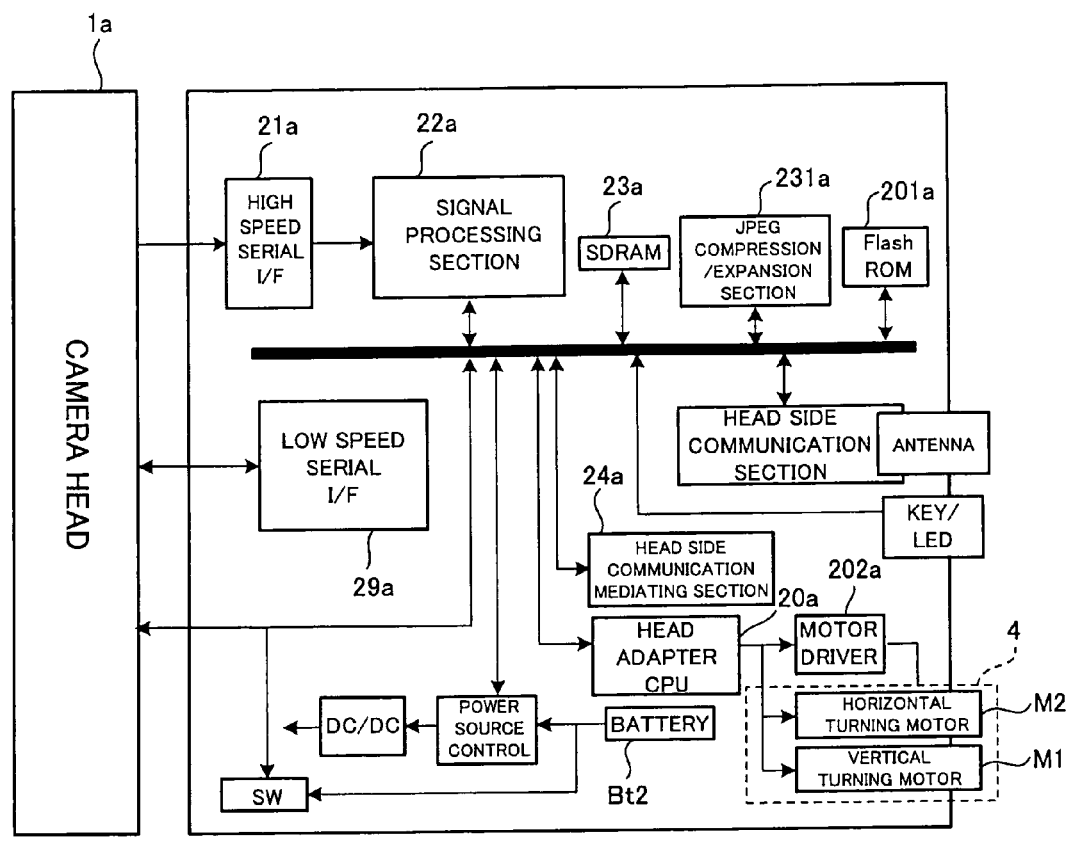
FIG. 23 is a block diagram of an electric system of the head adapter and the pedestal.

FIG. 23 is a block diagram of an electric system of the head adapter 2a and the pedestal 4. In order to distinguish the electric system of the head adapter 2a from the electric system of the pedestal 4, the electric system of the pedestal 4 is encircled with the dashed line.

The head side signal mediating section 24a converts the control signal received through the antenna, and transmits the converted control signal to a head adapter CPU 20a that is a panhead control section, so that a motor M1 for a vertical direction rotation and a motor M2 for a horizontal direction rotation are rotated by a motor driver 202a.

Here, there will be explained how an operation signal is transmitted from the camera main frame 1b to the head adapter CPU 20a that is the panhead control section.

Figure 24:
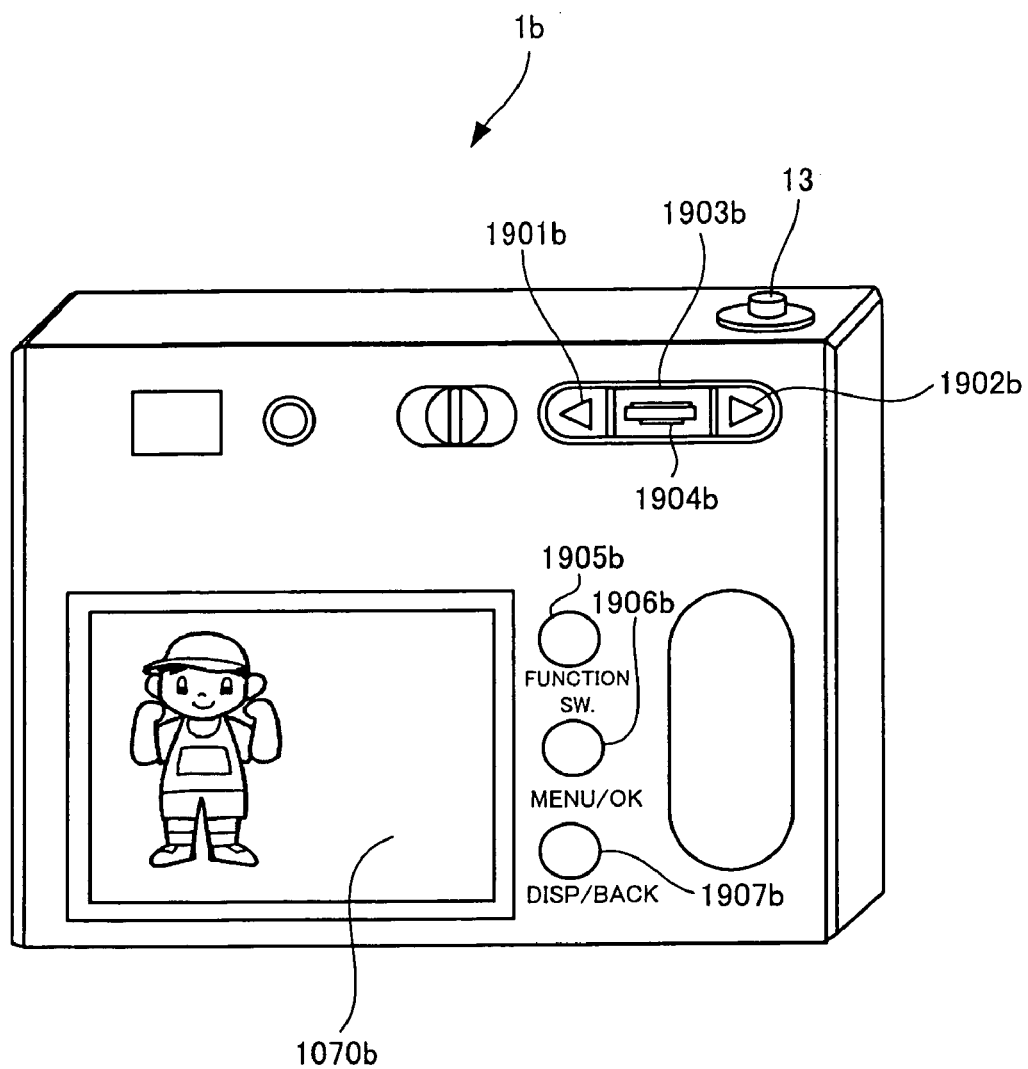
FIG. 24 is a view of the back of the camera main frame shown in FIG. 1.

FIG. 24 is a view of the back of the camera main frame 1b shown in FIG. 1.

As shown in FIG. 24, the camera main frame 1b has a LCD panel 1070b and handlers 1901b to 1907b.

According to the present embodiment, there is provided a function switching button 1905b for altering a function quota of up-down keys and right-left keys of the handlers. The operation of the function switching button 1905b makes it possible that the up-down keys and the right-left keys have different functions from their essential functions. This feature makes it possible to reduce the number of handlers, and thereby providing a camera system that is excellent in operational efficiency.

According to the present embodiment, in the event that the camera head 1a is separated from the camera main frame 1b, for example, when the right-left keys are depressed without depression of the function switching button 1905b, the zooming operation signal is transmitted to the camera head 1a in a similar fashion to that of the attachment, so that a position of the zoom lens of the image taking optical system is controlled to adjust the focal length. On the other hand, when the right-left keys are depressed after depression of the function switching button 1905b, a signal indicative of the rotary angle is transmitted to the panhead control section. In the event that the camera head 1a is mounted on the camera main frame 1b, when the right-left keys are depressed, the right-left keys serve as a turn on-off switching key in a macro mode. On the other hand, the right-left keys are depressed in a regeneration mode, the right-left keys serve as a zooming handler and a handler instructing a display area movement.

Assignment of different functions to the handlers makes it possible to reduce the number of parts, and thereby contributing to reducing the cost. Further, this feature makes it possible to provide a user interface that is excellent in operational efficiency.

Figure 25:
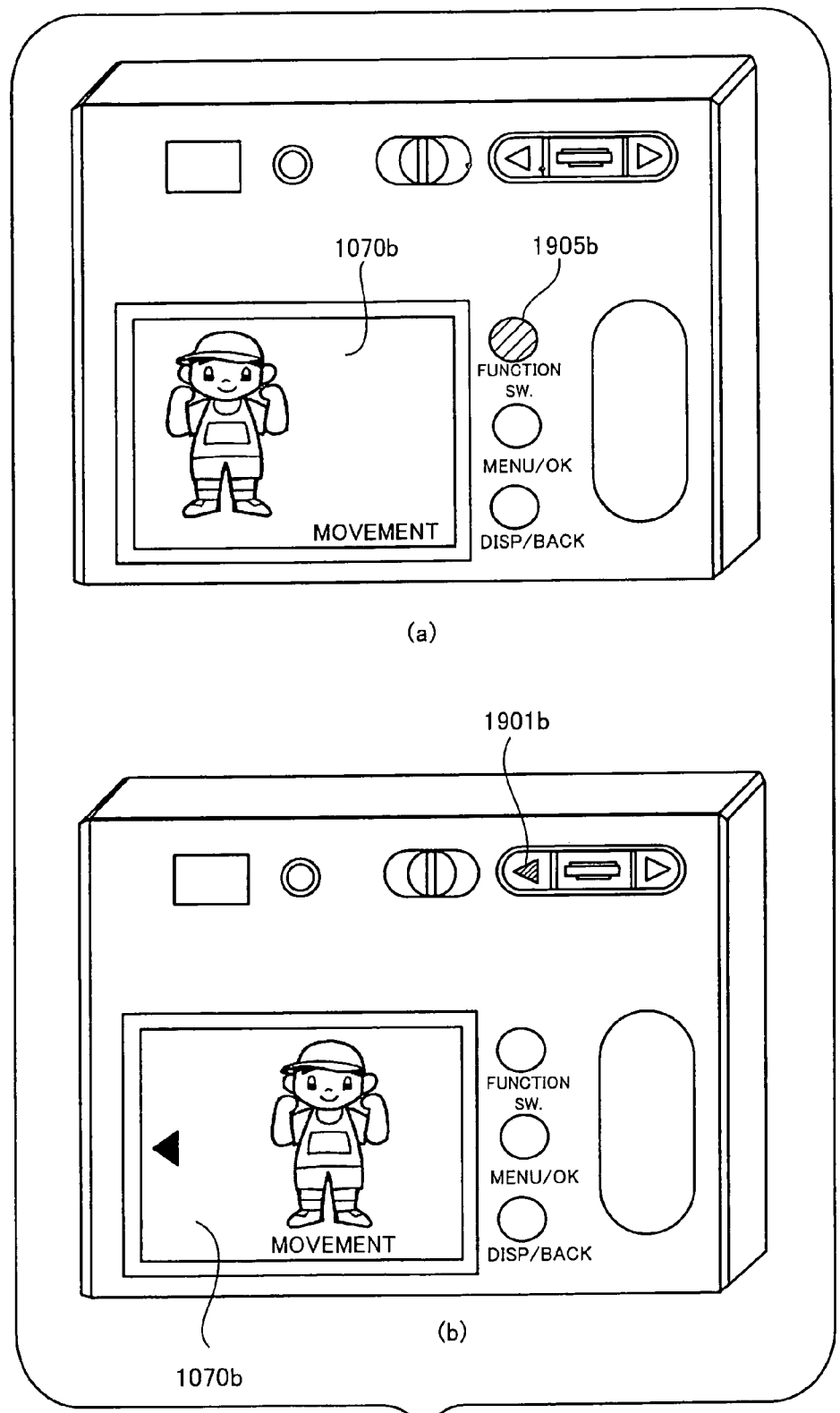
FIG. 25 is a view showing structural examples wherein different functions are allotted to a handler.

FIG. 25 is a view showing structural examples wherein different functions are allotted to a handler.

It is assumed that when a camera head is mounted on a pedestal and is located at a predetermined place, a subject shown in part (a) of FIG. 25 is caught by an image taking optical system of the camera head. At that time, when the left-key of the right-left keys is depressed after depression of the function switching button 1905b, there are displayed on a display screen a subject altered in picture angle of the camera head, as shown in part (b) of FIG. 25, together with a message of "movement".

This feature makes it possible to provide a camera system that is easy in use for a user and has a high function.

Figure 26:
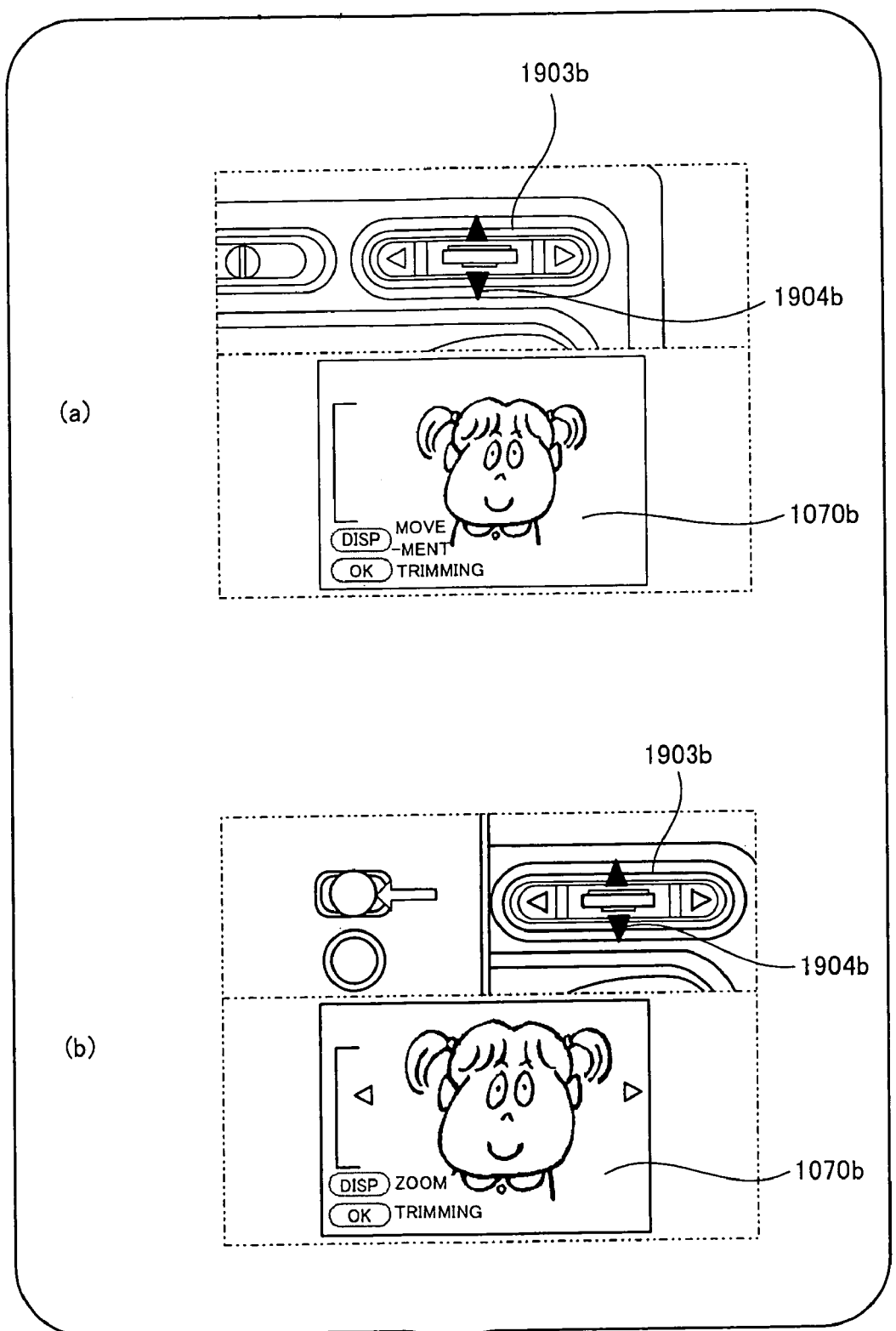
FIG. 26 is an explanatory view useful for understanding functions of right-left keys wherein a regeneration mode is selected.

FIG. 26 is an explanatory view useful for understanding functions of right-left keys wherein a regeneration mode is selected.

When the regeneration mode is selected, the right-left keys shown in FIG. 26 serve as an electronic zoom switch. Further, there is performed an operational display of DISP button and OK button. Providing users with a user interface of a high order makes it possible to provide a camera system that is easy in use for a user, and makes it possible for the maker of products to implement a reduction of costs owing to a reduction of the number of parts.

As mentioned above, according to the present invention, it is possible to implement a head adapter that is detachably mounted on a camera head wherein the camera head is separated from a camera main frame, a main frame adapter that is detachably mounted on the camera main frame, a camera head and camera main frame onto which those adapters are mounted, and a camera system having the camera head, the head adapter, the main frame adapter, and the camera main frame.

The use of the user interface of a high order makes it possible to implement a camera system capable of providing users with not only the operational efficiency but also a pleasant photographic environment.

As mentioned above, according to the present invention, it is possible to implement a camera system that is low cost, compact, and capable of performing photography according to a remote control, a head adapter capable of being readily mounted on a camera main frame when performing photography according to a remote control, and a main frame adapter.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera system comprising:
a camera head comprising an image taking optical system and an imaging device;
a camera main frame that receives an image signal from the camera head that is detachably mounted on the camera main frame;
a head adapter that is detachably mounted, instead of the camera main frame, on the camera head separated from the camera main frame; and
a main frame adapter that is detachably mounted, instead of the camera head, on the camera main frame from which the camera head is separated,
wherein the head adapter comprises:
a head side radio communication section that performs a radio communication between the head adapter and the main frame adapter; and
a head side signal mediating section that converts a format of a signal to be transferred between the camera head and the head side radio communicating section to mediate the signal to be transferred between the camera head and the head side radio communicating section, and
wherein the main frame adapter comprises:
a main frame side radio communication section that performs a radio communication between the head adapter and the main frame adapter; and
a main frame side signal mediating section that converts a format of a signal to be transferred between the camera main frame and the main frame side signal mediating section to mediate the signal to be transferred between the camera main frame and the main frame side signal mediating section,
wherein the head adapter has a pedestal which is a part of the head adapter or is a detachable part to the head adapter to support the camera head onto which the head adapter is mounted,
the pedestal has an adjustment mechanism that controls a direction of the camera head,
the camera main frame has a handler that controls a direction of the camera head,
the head adapter has a head driving section that receives a control signal according to an operation of the handler through the main frame adapter to drive the adjustment mechanism in accordance with the control signal, the handler is allotted with a function that is different from an adjustment for a direction of the camera head in a state that the camera head is directly mounted on the camera main frame, and the handler controls an electronic zoom function in the state that the camera head is directly mounted on the camera main frame and the handler controls the direction of the camera head through the adjustment mechanism via the control signal in a state that the camera head is separated from the camera main frame.

2. A camera system according to claim 1, wherein the main frame adapter operates upon receipt of supply of an electric power from the camera main frame.

3. A camera system according to claim 1, wherein the head adapter incorporates therein a battery and operates with an electric power from the battery, and supplies the electric power to the camera head.

4. A camera system according to claim 1, wherein the main frame adapter has a handler that controls a direction of the camera head, and the head adapter has a head driving section that receives a control signal according to an operation of the handler from the main frame adapter to drive the adjustment mechanism in accordance with the control signal.

5. A camera system according to claim 4, wherein the control signal is transmitted from the main frame adapter to the head adapter to be input to the head driving section of the head adapter, and the control signal serves as a rotary instruction to rotate the adjustment mechanism in a state that the camera head is separated from the camera main frame.

6. A camera system according to claim 1, wherein the camera main frame has initialization executing means that executes initialization for the camera system upon receipt of initialization information necessary for initialization for the camera system as to the main frame adapter, the head adapter, and the camera head onto which the head adapter is mounted, from the main frame adapter mounted on the camera main frame.

7. A camera system according to claim 1, wherein the camera main frame and the head adapter each have a mount section disposed thereon, and the camera head and the main frame adapter each have a terminal having a plurality of mount contacts, the mount contacts of the camera head are configured to engage the mount section of the camera main frame when the camera head is mounted on the camera main frame, the mount contacts of the camera head are configured to engage the mount section of the head adapter when the camera head is detached from the camera main frame, and the mount contacts of the main frame adapter are configured to engage the mount section of the camera main frame when the camera head is detached from the camera main frame.

8. A camera system according to claim 7, wherein the camera head is configured to be mounted directly onto the camera main frame such that, when the camera head is mounted on the mount section of the camera main frame, the camera head and the camera main frame constitute a single unit with abutting parts.

9. A camera system according to claim 7, wherein the main frame adapter is configured to be mounted directly onto the camera main frame and is detached from the mount section of camera mainframe to enable the camera head to be mounted on the mount section of the camera main frame.

10. A camera system according to claim 1, wherein the camera main frame includes a control means which controls photography taking operations of the camera head in both a state that the camera head is directly mounted on the camera main frame and a state that the camera head is separated from the camera main frame.

11. A camera system according to claim 1, wherein the camera main frame receives an image signal, obtained by the camera head, from the camera head in the state that the camera head is directly mounted on the camera main frame, and the camera main frame receives the image signal, obtained by the camera head, from the camera head through a transmission from the head adapter to the main frame adapter the state that the camera head is separated from the camera main frame.

12. A camera system according to claim 1, wherein the pedestal is configured to support the camera head onto which the head adapter is mounted when the camera head is detached from the camera main frame.

13. A camera system according to claim 1, wherein the control signal is transmitted from the main frame adapter to the head adapter to be input to the head driving section of the head adapter, and the control signal serves as a rotary instruction to rotate the adjustment mechanism in a state that the camera head is separated from the camera main frame.

14. A camera system according to claim 13, wherein an input to the handler of the camera main frame controls the head driving section and the adjustment mechanism via the control signal in a state that the camera head is separated from the camera main frame.

15. A camera system according to claim 1, wherein a same input key of the handler performs a different function based on a determination of which mounting state the camera head is in with respect to the camera main frame.

16. A camera system according to claim 1, wherein the head adapter and the camera main frame each include a image signal processing section which perform at least one of optical balance correction and auto white balance.

17. A main frame adapter comprising:

a main frame side radio communication section that performs a radio communication with a head adapter mounted on a camera head; and a main frame side signal mediating section that converts a format of a signal transferred between a camera main frame and the main frame side radio communication section to mediate the signal to be transferred between the camera main frame and the main frame side signal communication section, wherein the main frame adapter is, instead of a camera head, detachably mounted on the camera main frame, the camera head comprising an image taking optical system and an imaging device, and the camera main frame adapted to receive and process an image signal from the camera head mounted on the camera main frame without the head adapter detachably mounted on the camera head, the head adapter has a pedestal which is a part of the head adapter or is a detachable part to the head adapter to support the camera head onto which the head adapter is mounted, the pedestal has an adjustment mechanism that controls a direction of the camera head, the camera main frame has a handler that controls a direction of the camera head, the head adapter has a head driving section that receives a control signal according to an operation of the handler through the main frame adapter to drive the adjustment mechanism in accordance with the control signal, the handler is allotted with a function that is different from an adjustment for a direction of the camera head in a state that the camera head is directly mounted on the camera main frame, and the handler controls an electronic zoom function in the state that the camera head is directly mounted on the camera main frame and the handler controls the direction of the camera head through the adjustment mechanism via the control signal in a state that the camera head is separated from the camera main frame.

18. A head adapter comprising:

a head side radio communication section that performs a radio communication between the head adapter and a main frame adapter mounted on a camera main frame; and a head side signal mediating section that converts a format of a signal transferred between a camera head and the head side radio communication section to mediate the signal to be transferred between the camera head and the head side radio communication section, wherein the head adapter is, instead of the camera main frame, detachably mounted on the camera head separated from the camera main frame, the camera head comprising an image taking optical system and an imaging device, and the camera main frame adapted to receive an image signal from the camera head that is, instead of a main frame adapter, detachably mounted on the camera main frame to transmit the image signal, the head adapter has a pedestal which is a part of the head adapter or is a detachable part to the head adapter to support the camera head onto which the head adapter is mounted, the pedestal has an adjustment mechanism that controls a direction of the camera head, the camera main frame has a handler that controls a direction of the camera head, the head adapter has a head driving section that receives a control signal according to an operation of the handler through the main frame adapter to drive the adjustment mechanism in accordance with the control signal, the handler is allotted with a function that is different from an adjustment for a direction of the camera head in a state that the camera head is directly mounted on the camera main frame, and the handler controls an electronic zoom function in the state that the camera head is directly mounted on the camera main frame and the handler controls the direction of the camera head through the adjustment mechanism via the control signal in a state that the camera head is separated from the camera main frame.

* * * * *